US008496358B2

(12) United States Patent
McEntee

(10) Patent No.: US 8,496,358 B2
(45) Date of Patent: Jul. 30, 2013

(54) FRESNEL REFLECTION DEVICE FOR CONCENTRATION OR COLLIMATION

(75) Inventor: John McEntee, Boulder Creek, CA (US)

(73) Assignee: John McEntee, Boulder Creek, CA (US)

( * ) Notice: Subject to any disclaimer, the term of this patent is extended or adjusted under 35 U.S.C. 154(b) by 196 days.

(21) Appl. No.: 13/041,355

(22) Filed: Mar. 5, 2011

(65) Prior Publication Data

US 2011/0216535 A1   Sep. 8, 2011

Related U.S. Application Data

(60) Provisional application No. 61/311,290, filed on Mar. 6, 2010.

(51) Int. Cl.
*F21V 7/00* (2006.01)
(52) U.S. Cl.
USPC . 362/297; 362/247; 362/249.01; 362/249.05; 362/296.05; 359/851
(58) Field of Classification Search
USPC ............... 362/227, 235, 247, 249.01, 249.02, 362/249.06, 296.01, 296.05, 297, 300, 311.01, 362/311.02; 359/720, 851
See application file for complete search history.

(56) References Cited

U.S. PATENT DOCUMENTS

| 5,639,158 A | 6/1997 | Sato | 362/247 |
|---|---|---|---|
| 6,131,565 A | 10/2000 | Mills | 126/577 |
| 2004/0114244 A1 | 6/2004 | Couzin | 359/530 |
| 2006/0060188 A1 | 3/2006 | Hickerson | 126/680 |
| 2006/0268576 A1 | 11/2006 | Matsui et al. | 362/613 |
| 2008/0142078 A1 | 6/2008 | Johnson | 136/259 |
| 2008/0223443 A1 | 9/2008 | Benitez et al. | 136/259 |
| 2009/0038608 A1 | 2/2009 | Caldwell | 126/600 |
| 2009/0056698 A1 | 3/2009 | Johnson et al. | 126/569 |
| 2009/0133685 A1 | 5/2009 | Pham et al. | 126/569 |
| 2009/0277440 A1 | 11/2009 | Angel et al. | 126/601 |

FOREIGN PATENT DOCUMENTS

| WO | WO 91/04442 A1 | 4/1991 |
|---|---|---|
| WO | 2008/118980 | 10/2008 |
| WO | 2009/099547 | 8/2009 |

OTHER PUBLICATIONS

Schramek et al., "Multi-tower solar array", Jul. 17, 2003, Science Direct sciencedirect.com.
Mills et al., "Project Proposal for a Compact Linear Fresnel Reflector Solar Thermal Plant in the Hunter Valley", Apr. 2003 School of Physics, Sydney NSW Australia.
Mills et al, "Multi-tower Line Focus Fresnel Array Project", Feb. 2006, Journal of Solar Energy Engineering.
International Search Report and Written Opinion for PCT/US2011/027324, mailed on Oct. 31, 2011.

*Primary Examiner* — Stephen F Husar
*Assistant Examiner* — Meghan Dunwiddie
(74) *Attorney, Agent, or Firm* — Martine Penilla Group, LLP

(57) ABSTRACT

An apparatus for concentrating solar radiation includes a number of modules. Each module has three receivers for receiving reflected radiation and a reflecting surface. The receivers form a triangle in a plane approximately parallel to the reflecting surface. The reflecting surface has a number of reflectors. Each of the reflectors includes three mirrored facets which are each oriented such that light reflected from the facet is directed to one of the three receivers. Further, each of the reflectors is positioned with respect to the receivers and the other reflectors to reduce facet shading.

20 Claims, 33 Drawing Sheets

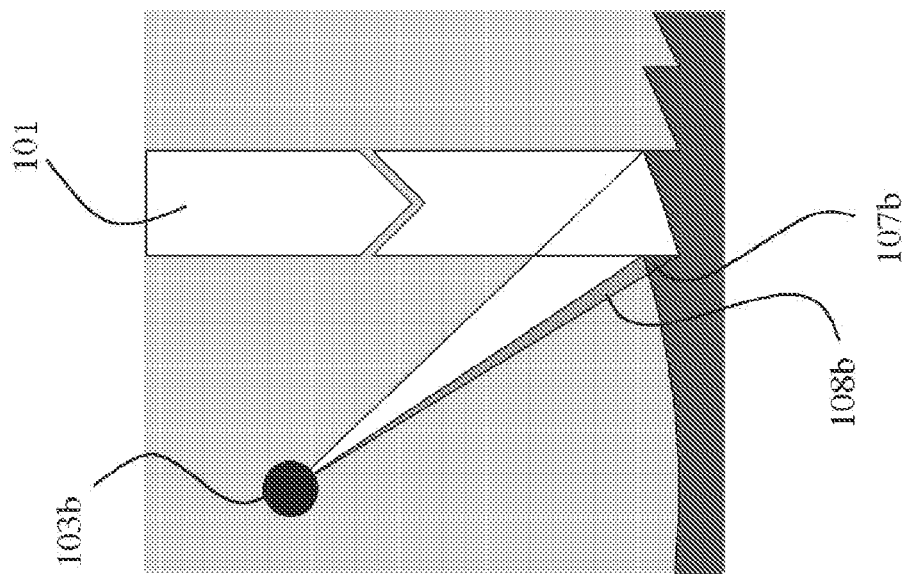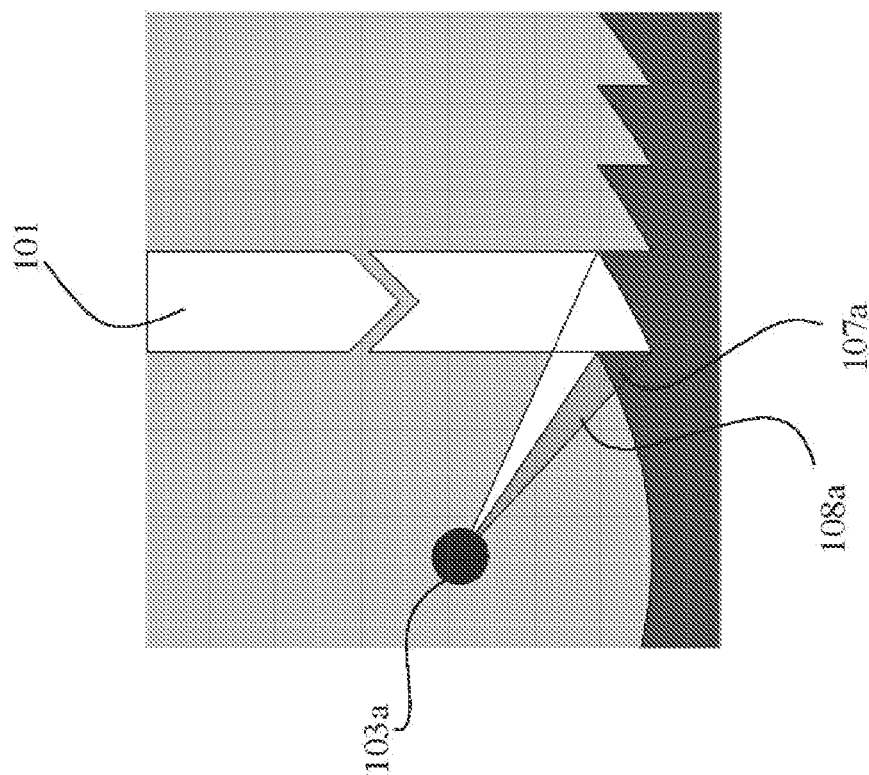
PRIOR ART
Figure 1C

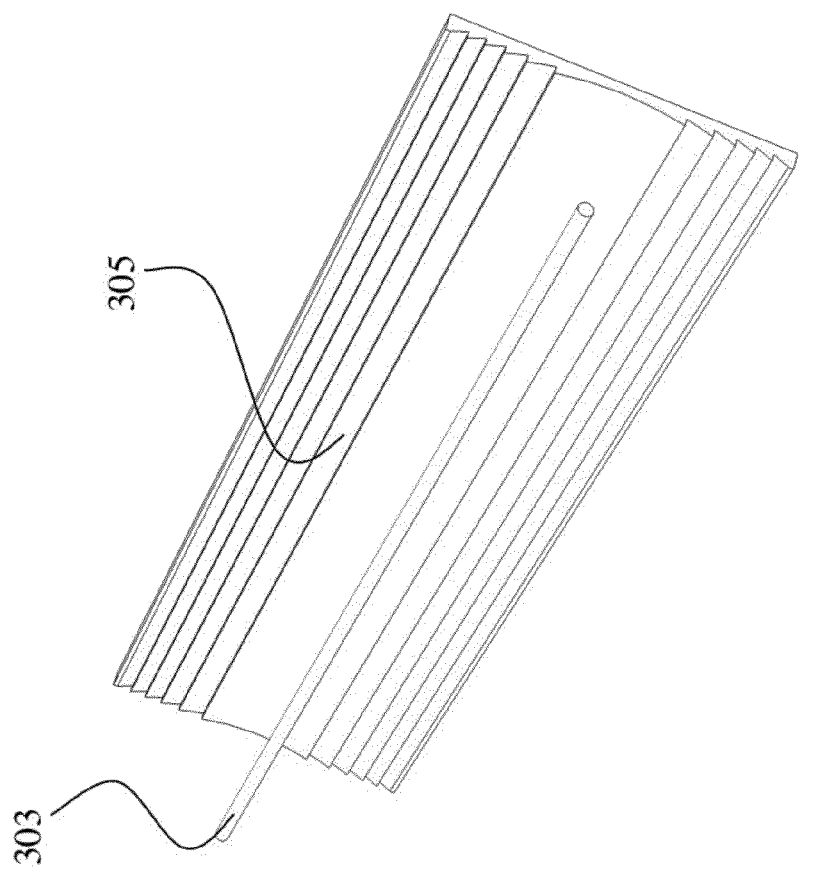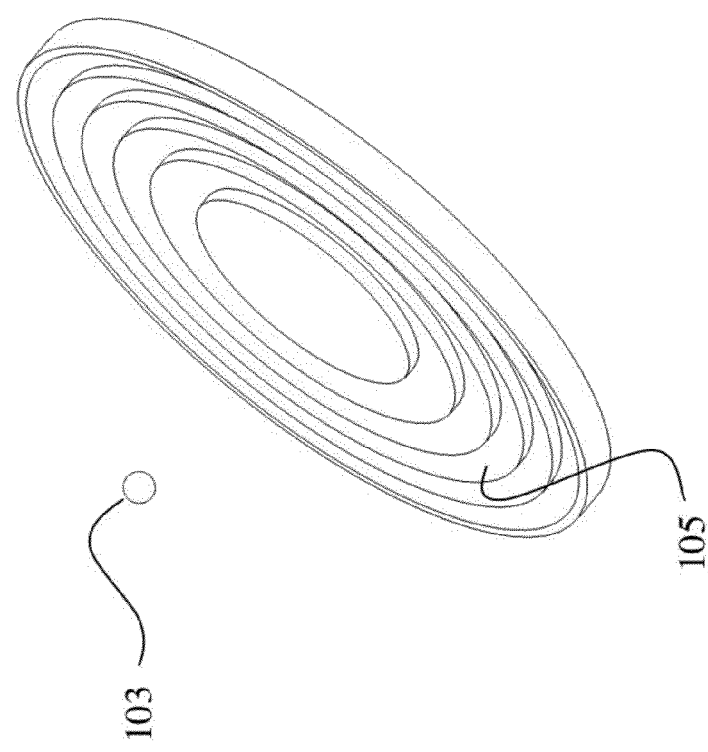
Figure 3

For flat-surfaced facets:

$$\alpha_1 = 90° - \frac{\gamma + \arctan\left(\frac{h_1}{d_1}\right)}{2}$$

$$\alpha_2 = \frac{\gamma - \arctan\left(\frac{h_2}{d_2}\right)}{2}$$

For both flat-surfaced and parabolic-surfaced facets:

$$\theta_1 = \arctan\left(\frac{h_1}{d_1}\right)$$

$$\theta_2 = \arctan\left(\frac{h_2}{d_2}\right)$$

Where:

$\alpha_1 \leq \theta_2$

And $\alpha_2 \leq \theta_1$

Figure 24D

FRESNEL REFLECTION DEVICE FOR CONCENTRATION OR COLLIMATION

CLAIM OF PRIORITY

This application claims priority to U.S. Patent Application No. 61/311,290, filed on Mar. 6, 2010, whose disclosure is hereby incorporated by reference.

BACKGROUND

Fresnel reflectors are useful for both focusing or concentrating light, such as sunlight, and generating collimated light. They have practical applications ranging from heliostat arrays to pocket flashlights. However, Fresnel reflectors are prone to a phenomenon known as facet shading or cosine loss, which occurs when one facet in the reflector occludes the reflected or projected light of another facet in the reflector.

In order to reduce or compensate for facet shading, designs for Fresnel reflectors often increase the height of receivers for reflected light or sources for projected light. Or the designs increase the distance between facets and compensate for the loss of optical efficiency by increasing the area that the reflector system covers. Of course, all of these increases come at a cost, in terms of resources and space.

SUMMARY

In an example embodiment, an apparatus for reducing facet shading includes a substrate with three points that form a triangle. Interior to the three points are a number of reflecting regions. Each reflecting region includes three reflecting facets. Each reflecting facet is oriented such that light reflected from the facet is directed to one of the three points. Further, each reflecting facet is positioned to reduce facet shading from any other reflecting facet in the region or any other region.

In another example embodiment, an apparatus for reducing facet shading includes a plurality of substrate modules. Each substrate module has three points that form a triangle. Interior to the three points are a number of reflecting regions. Each reflecting region includes three reflecting facets. Each reflecting facet is oriented such that its reflected light is directed to or from one the three points. Further, each reflecting facet is positioned to reduce facet shading from any other reflecting facet in the region or any other region.

In another example embodiment, an apparatus for reducing facet shading includes a substrate with four points that form a rectangle. Interior to the four points are a number of reflecting regions. Each reflecting region includes four reflecting facets. Each reflecting facet is oriented such that light reflected from the facet is directed to one the four points. Further, each reflecting facet is positioned to reduce facet shading from any other reflecting facet in the region or any other region.

In another example embodiment, an apparatus for receiving radiation includes three receivers for receiving reflected radiation. The receivers form a triangle in a plane approximately parallel to a reflecting surface with a number of reflectors. Each of the reflectors includes three mirrored facets which are each oriented such that light reflected from the facet is directed to one of the three receivers. Further, each of the reflectors is positioned with respect to the receivers and the other reflectors to reduce facet shading.

In another example embodiment, an apparatus for concentrating solar radiation includes a number of modules. Each module has three receivers for receiving reflected radiation and a reflecting surface. The receivers form a triangle in a plane approximately parallel to the reflecting surface. The reflecting surface has a number of reflectors. Each of the reflectors includes three mirrored facets which are each oriented such that light reflected from the facet is directed to one of the three receivers. Further, each of the reflectors is positioned with respect to the receivers and the other reflectors to reduce facet shading.

In another example embodiment, an apparatus for generating radiation includes three sources for producing radiation. The sources form a triangle in a plane approximately parallel to a reflecting surface and the reflecting surface with a number of reflectors. Each of the reflectors includes three mirrored facets which are each oriented such that its reflected light is directed from one of the three sources, away from the reflecting surface and approximately parallel to each other. Further, each of the reflectors is positioned with respect to the sources and the other reflectors to reduce facet shading.

In another example embodiment, an apparatus for generating collimated light includes a number of modules. Each module has three sources for generating light and a reflecting surface. The sources form a triangle in a plane approximately parallel to the reflecting surface. The reflecting surface has a number of reflectors. Each of the reflectors includes three mirrored facets which are each oriented such that light reflected from the facet is directed from one of the three sources, away from the reflecting surface and approximately parallel to each other. Further, each of the reflectors is positioned with respect to the sources and the other reflectors to reduce facet shading.

In another example embodiment, an apparatus for generating radiation includes a number of linear sources for producing radiation above a reflecting surface with a number of reflectors. Each of the reflectors includes two linear mirrored facets which are each oriented such that light reflected from the facet is directed from one of the linear sources. Further each of the reflectors is positioned with respect to the sources and the other reflectors to reduce facet shading.

The advantages of the present invention will become apparent from the following detailed description, which taken in conjunction with the accompanying drawings, illustrates by way of example the principles of the invention.

BRIEF DESCRIPTION OF THE DRAWINGS

FIGS. 1A, 1B, 1C, and 1D are diagrams explaining the phenomenon of facet shading (or cosine loss) associated with Fresnel reflectors.

FIG. 3 is a diagram showing point-focused and linear-focused Fresnel reflectors, which might be used with example embodiments.

FIGS. 24A, 24B, 24C, 24D are diagrams describing an example calculation of angles for opposing facets.

DETAILED DESCRIPTION

In the following description, numerous specific details are set forth in order to provide a thorough understanding of the example embodiments. However, it will be apparent to one skilled in the art that the example embodiments may be practiced without some of these specific details. In other instances, implementation details and process operations have not been described in detail, if already well known.

FIGS. 1A, 1B, 1C, and 1D are diagrams explaining the phenomenon of facet shading (or cosine loss) associated with Fresnel reflectors. As depicted in cross-section in FIG. 1A, a parabolic reflector 100 includes a single parabolic reflection surface 102 that focuses or concentrates light 101 (or other radiation such as microwave radiation or sound) on a receiver 103.

Figure 1A:
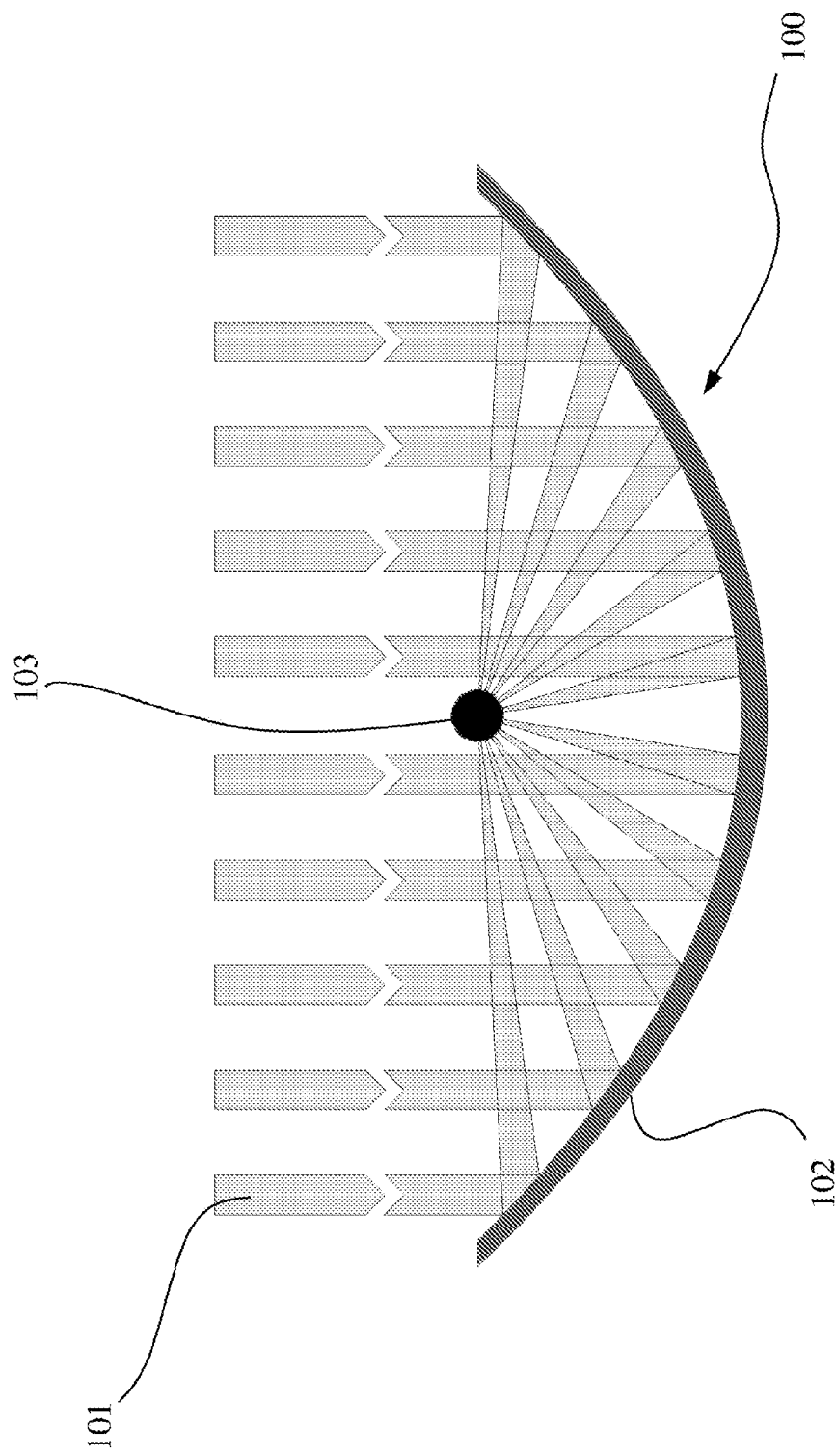
Figure 1B:
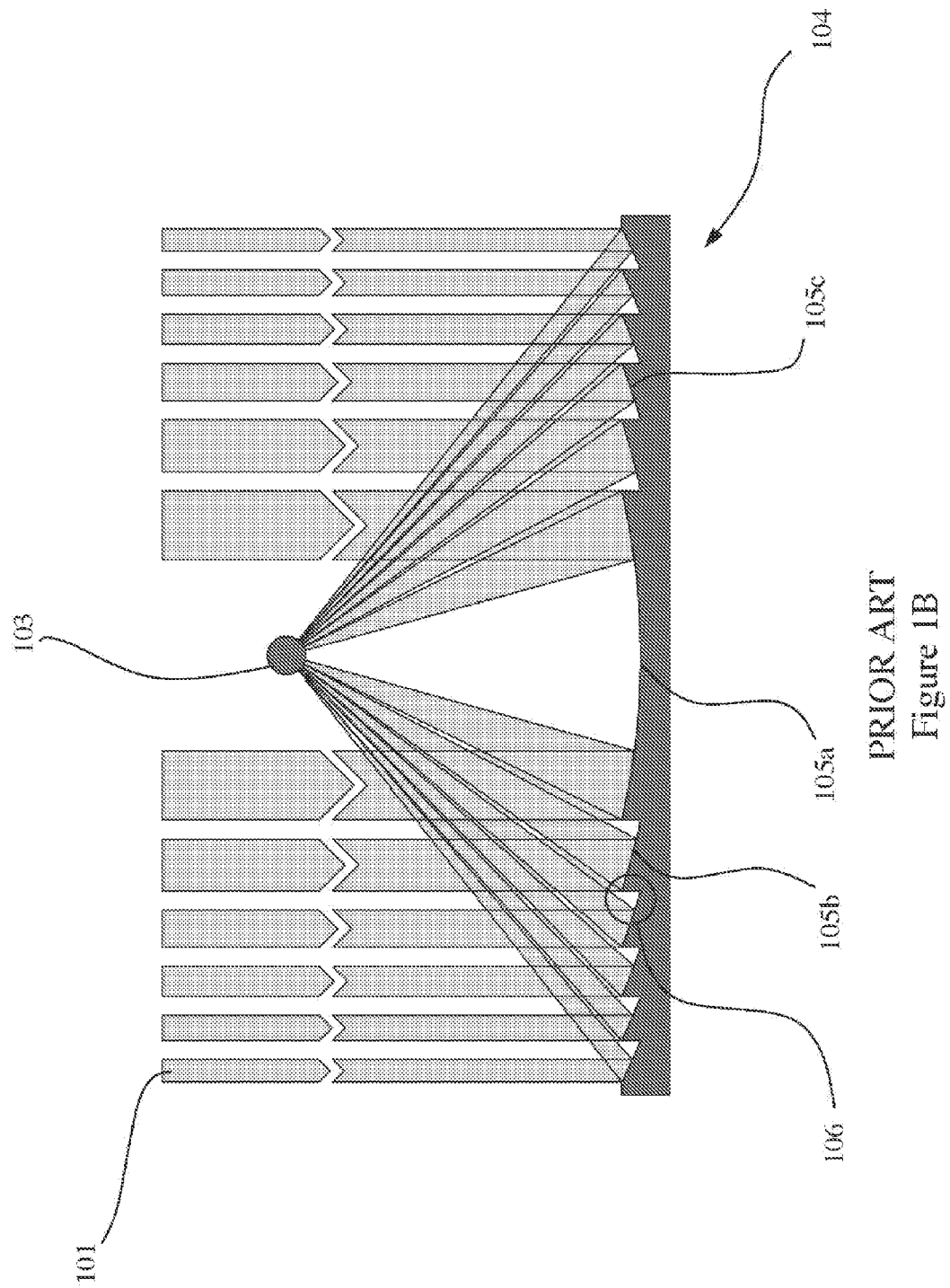

FIG. 1B shows cross-section of a Fresnel reflector 104 which includes multiple parabolic reflection surfaces 105a, 105b, 105c, etc., which are concentrically combined. Although Fresnel reflectors have advantages in compactness, reduction of materials and weight over parabolic reflectors such as parabolic reflector 100, they have a disadvantage in optical efficiency due to "facet shading". FIG. 1B shows the phenomenon of facet shading (or cosine loss) 106, which results when a facet of inner parabolic reflection surface 105b occludes the reflection of light 101 (or other radiation such as microwave radiation or sound) to receiver 103 from outer parabolic reflection surface 105c.

FIG. 1C shows a close-up diagram of this phenomenon in two diagrams. In the leftmost diagram in FIG. 1C, a relatively large amount (e.g., 50%) of light 101 is blocked by facet 107a as it is reflected from a parabolic reflection surface to receiver 103a, resulting in facet shading 108a. In the rightmost diagram in FIG. 1C, a relatively small amount (e.g., 25%) of light 101 is blocked by facet 107b as it is reflected from a parabolic reflection surface to receiver 103b, resulting in facet shading 108b. It will be appreciated that the focal-point height for receiver 103b is considerably larger than the focal-point height for receiver 103a. That is, there is an inversely proportional relationship between a receiver's focal-point height and the amount of facet shading in a Fresnel reflector, as explained in greater detail below.

Figure 1D:
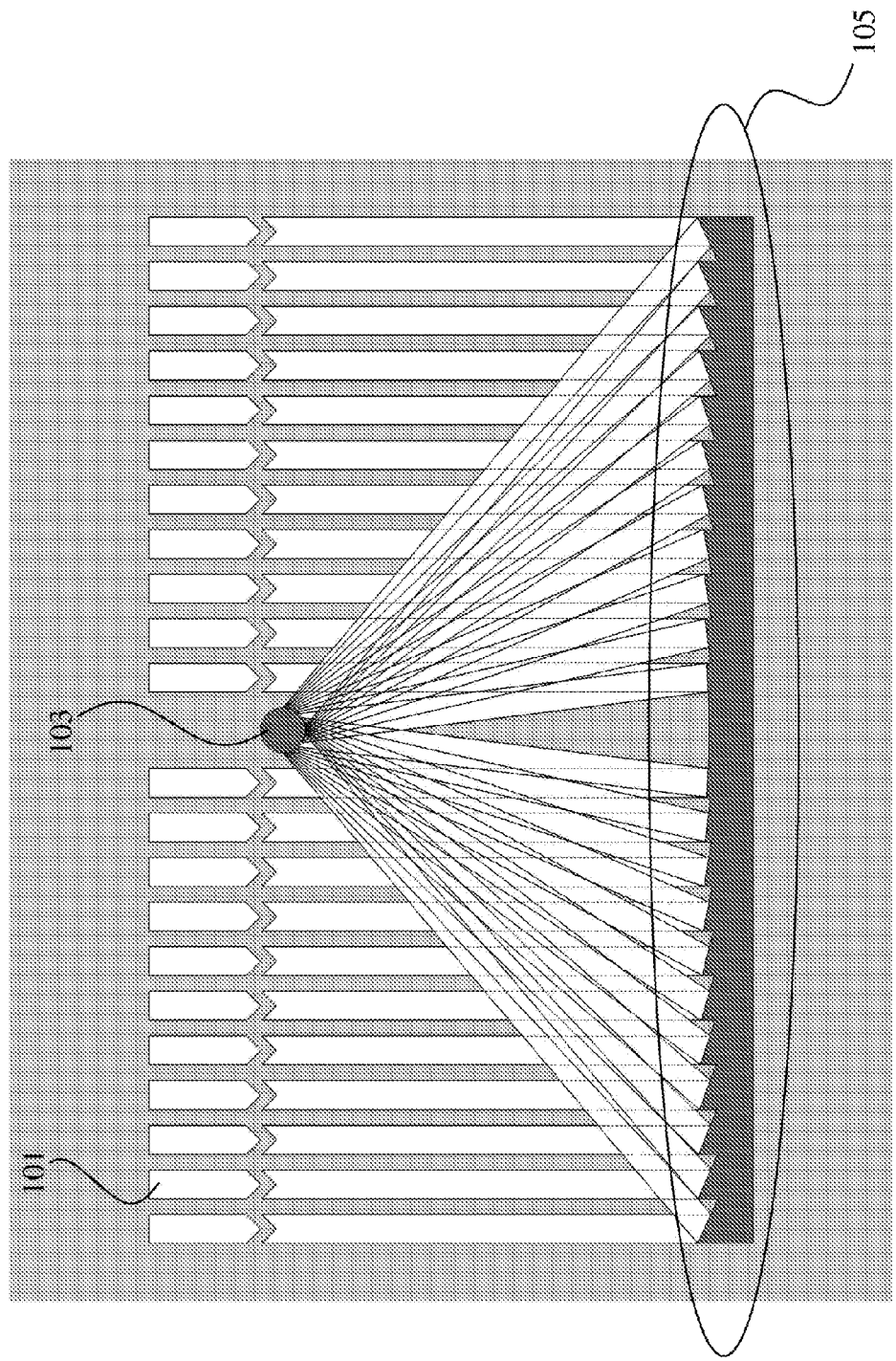

FIG. 1D shows how small flat Fresnel facets 105 are used to create a relatively high concentration of light. The smaller the facet size, the smaller the focus and therefore the higher the concentration of light from a given illuminated area (aperture).

Facet shading can also occur in heliostat arrays commonly used for solar power plants. In some implementations, heliostat arrays are implemented as large Fresnel reflecting systems covering numerous acres.

Figure 2:
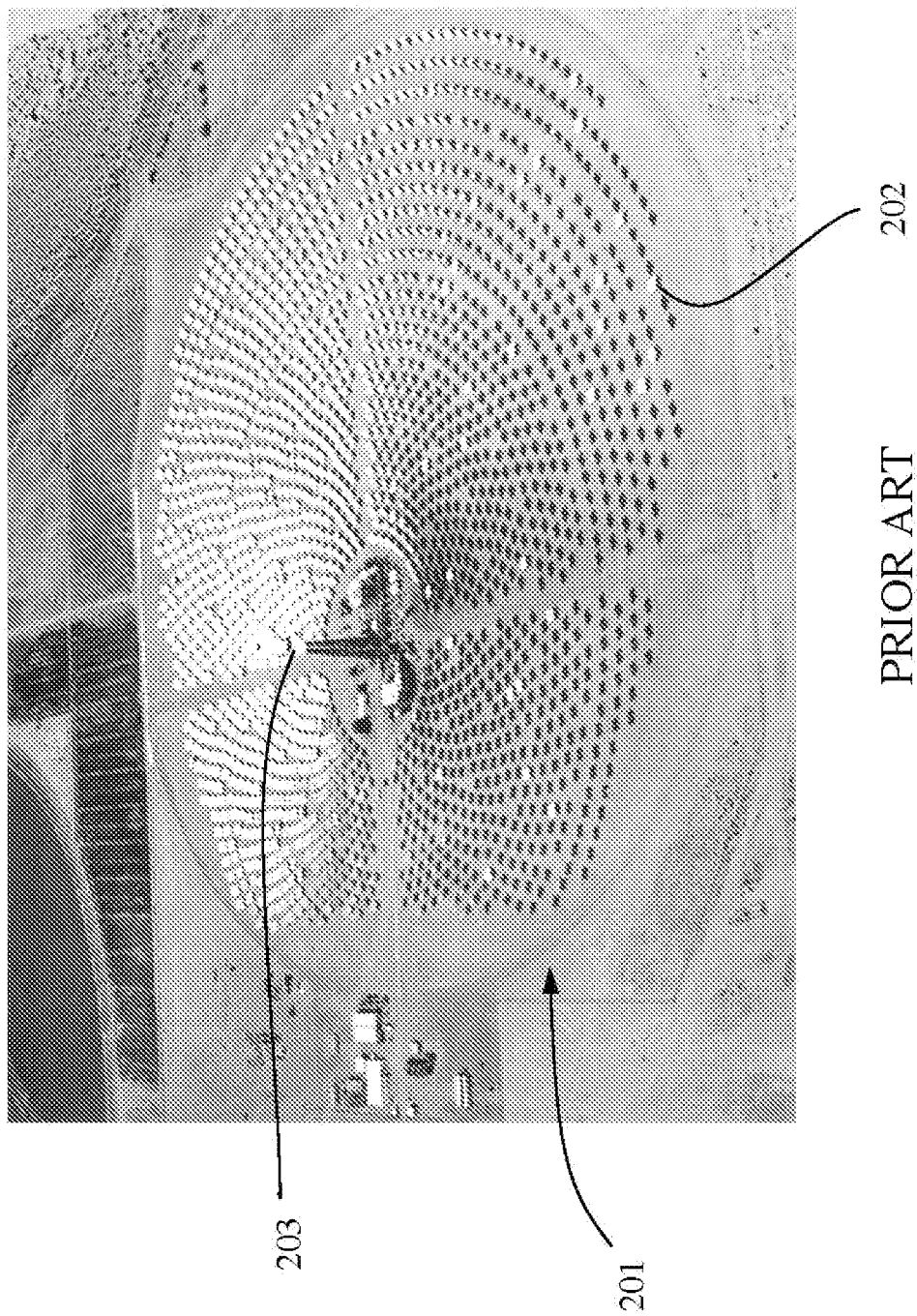
FIG. 2 shows a heliostat array or power plant which uses a Fresnel reflecting system.

FIG. 2 shows such a heliostat array (or power plant) 201. (This figure includes an aerial view of Solar One, an actual 10-megawatt heliostat power plant.) As depicted in this figure, a central receiving tower 203 receives reflected sunlight from numerous reflecting units (or heliostats) 202 which individually track the movement of the sun so as to maintain focus on the central receiver. In order to reduce facet shading, the central receiving tower 203 has a long focal-point height (e.g., it is tall) and the heliostats farther from the central receiving tower are spaced farther from each other. It will be appreciated that the space between heliostats is larger than the space taken up by the reflecting units (or heliostats) of the Fresnel reflecting system.

FIG. 3 is a diagram showing point-focused and linear-focused Fresnel reflectors, which might be used with example embodiments. As depicted in this figure, the leftmost Fresnel reflector, which is circular in shape, is similar to the Fresnel reflectors described earlier, insofar as it contains a number of concentric parabolic reflection surfaces 105 that focus radiation on a receiver 103, which might be thought of as a single point. In contrast, the rightmost Fresnel reflector, which is rectangular in shape, contains a number of concentric parabolic reflection surfaces 305 that focus radiation on a linear receiver 303. It will be appreciated that a Fresnel reflector can be used to focus rays to a single point or, in reverse, produce collimated rays from a source which acts as a single point. The same is true of a linear-focused Fresnel reflector. Consequently, example embodiments described below for focusing or concentrating light can be easily modified by one skilled in the art to generate collimated light (e.g., by converting a light receiver into a light source).

Figure 4:
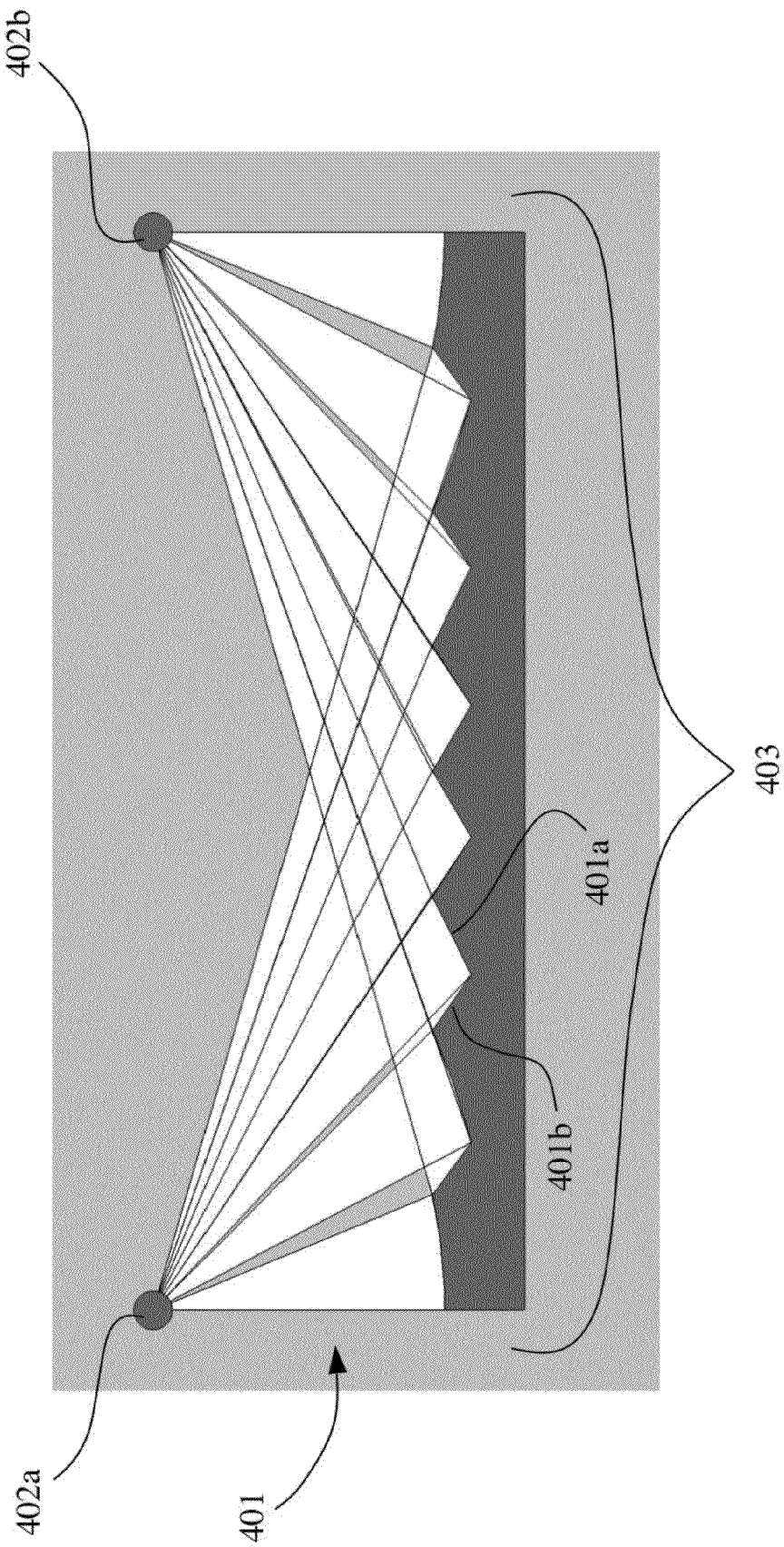
FIG. 4 is a cross-sectional diagram showing a multiple-receiver system with reduced facet shading, in accordance with an example embodiment.

FIG. 4 is a cross-sectional diagram showing a multiple-receiver system with reduced facet shading, in accordance with an example embodiment. As shown in this figure, multiple-receiver system 401 includes zone 403 with opposing reflecting facets 401a and 401b. Facet 401a focuses reflected light (or other radiation such as microwave radiation or sound) on receiver 402a, whereas facet 401b focuses reflected light (or other radiation such as microwave radiation or sound) on receiver 402b. Moreover, it will be appreciated that the angles of the opposing facets 401a and 401b are designed so as to reduce or avoid facet shading even when the receivers 402a and 402b have short focal-point heights relative to a system with a single receiver. Example calculations for the angles which might be used with such opposing facets are included later under the heading, "ANGLE CALCULATIONS". Here again it should be recalled that light receivers 402a and 402b might be light sources in an alternative example embodiment where the system generates collimated light rather than concentrated or focused light.

It will be appreciated that the minimum size of a reflecting facet is determined by manufacturing considerations and limits due to diffractive effects. The size of the zones is dependent on the focal-point height of a light receiver or light source. In example embodiments, the number of reflecting facets in a zone can be as few as four. The maximum number of reflecting facets in a zone is also determined by manufacturing considerations and diffractive effects.

It will also be appreciated that light receivers or light sources with relatively shorter focal-point heights might be less expensive on a per item basis. Likewise, they might less obtrusive and therefore more aesthetically pleasing, when used in a large-scale system such as a heliostat array or power plant.

Figure 5:
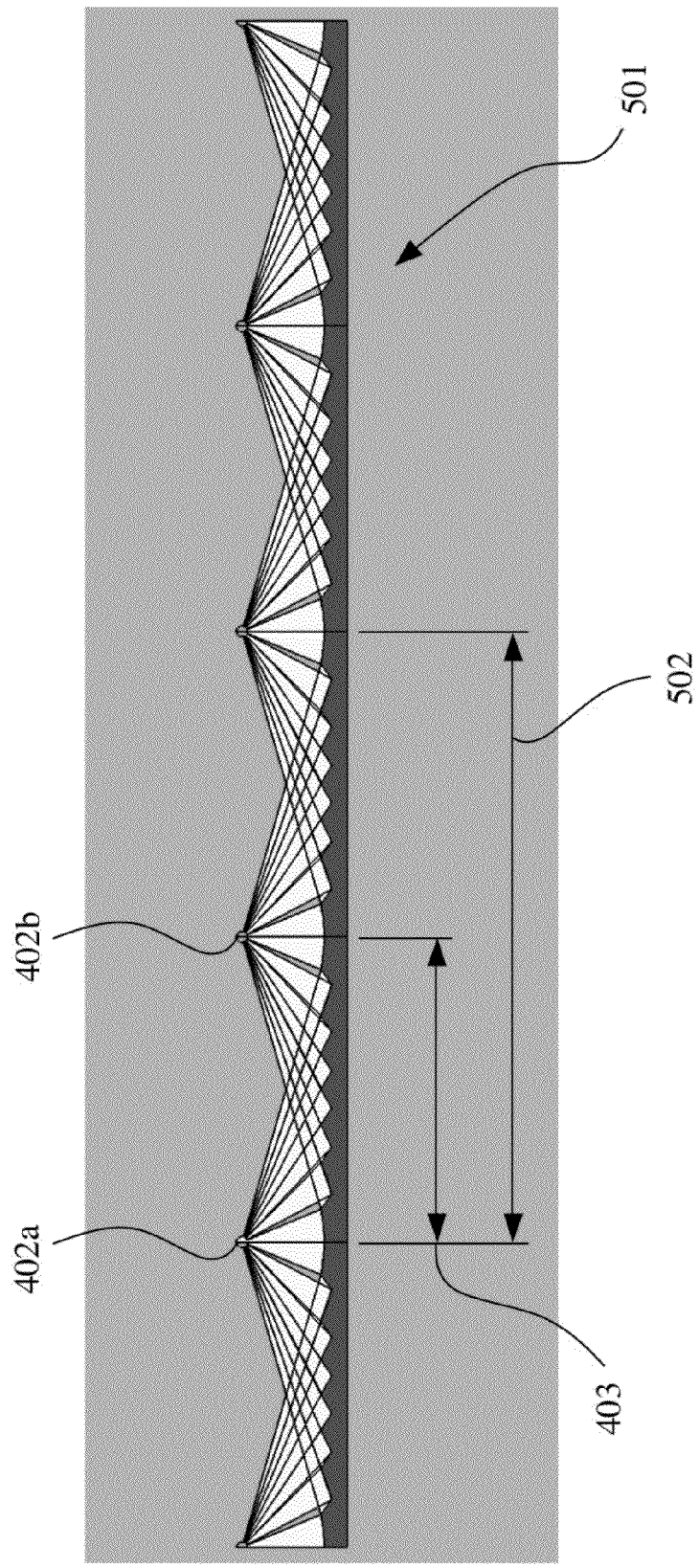
FIG. 5 is cross-sectional diagram showing a number of zones and apertures in a multiple-receiver system with reduced facet shading, in accordance with an example embodiment.

FIG. 5 is cross-sectional diagram showing a number of zones and apertures in a multiple-receiver system with reduced facet shading, in accordance with an example embodiment. As depicted in this figure, a multiple-receiver system 501 includes a number of zones 403, which extend from one receiver (e.g., 402a) to another receiver (e.g., 402b). Also, as depicted in this figure, the two adjacent zones which share a receiver (e.g., 402b) make up an aperture 502. In an example embodiment, the focal-point height, as described above, of a receiver (e.g., 402b) might be as small as one-sixth of the aperture 502 without giving rise to significant facet shading. Also, in an example embodiment, flat reflecting facets might be used, whereas in an alternative example embodiment, parabolic (or concentrating) reflecting facets might be used. It should be recalled that light receivers 402a and 402b might be light sources in an alternative example embodiment where the system generates collimated light rather than concentrated or focused light.

Figure 6:
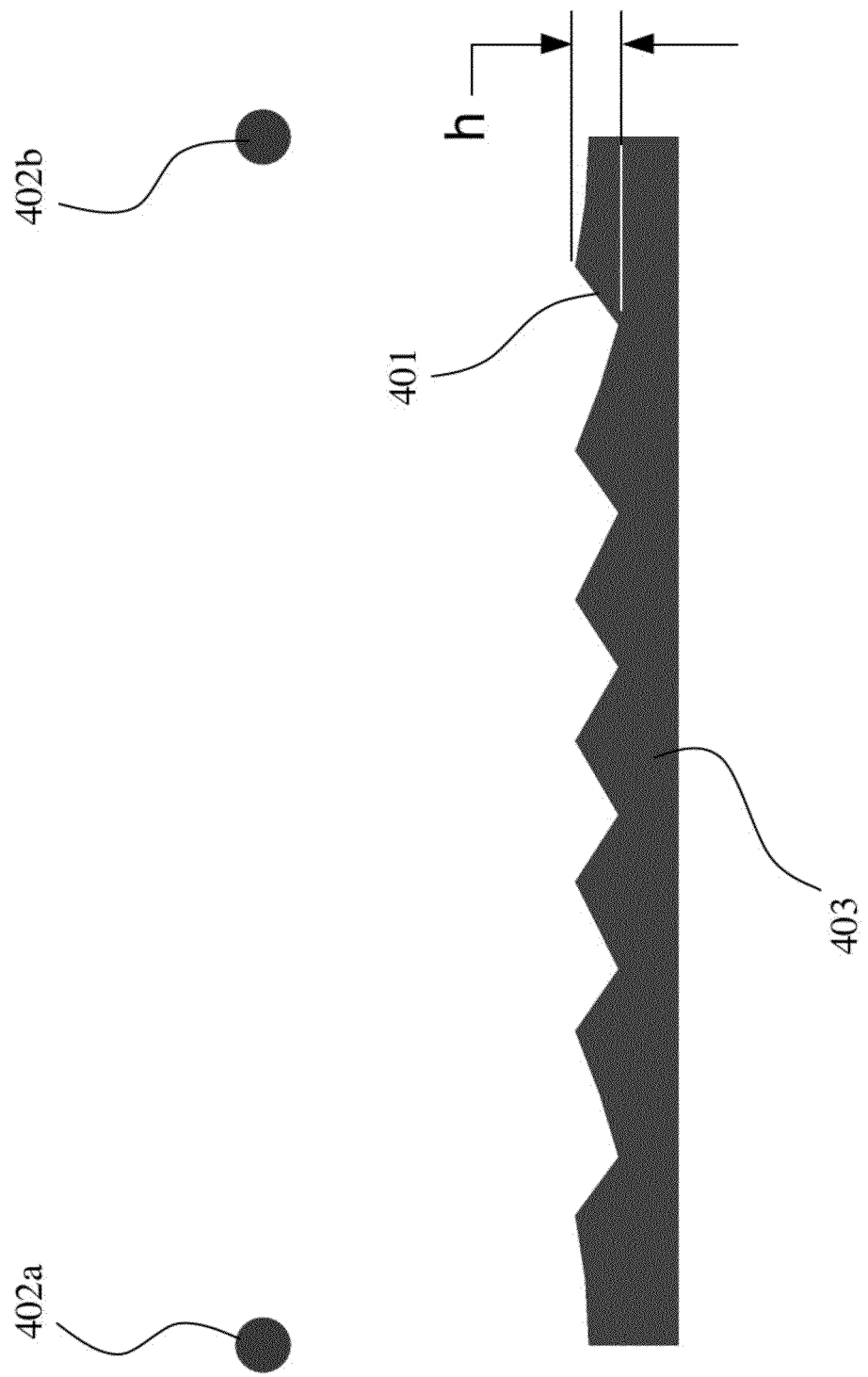
FIG. 6 is a cross-sectional diagram showing a multiple-receiver system with reflecting facets having constant height, in accordance with an example embodiment.

FIG. 6 is diagram showing a multiple-receiver system with reflecting facets having constant height, in accordance with an example embodiment. As depicted in this figure, zone 403 reflects light using reflecting facets to receivers 402a and 402b. Each of the reflecting facets (e.g., facet 401) has a constant height, h, though the width of each fact might vary, in an example embodiment. It will be appreciated that a constant height facilitates the manufacture of reflecting facets with uniform thickness using techniques such as embossing.

Figure 7:
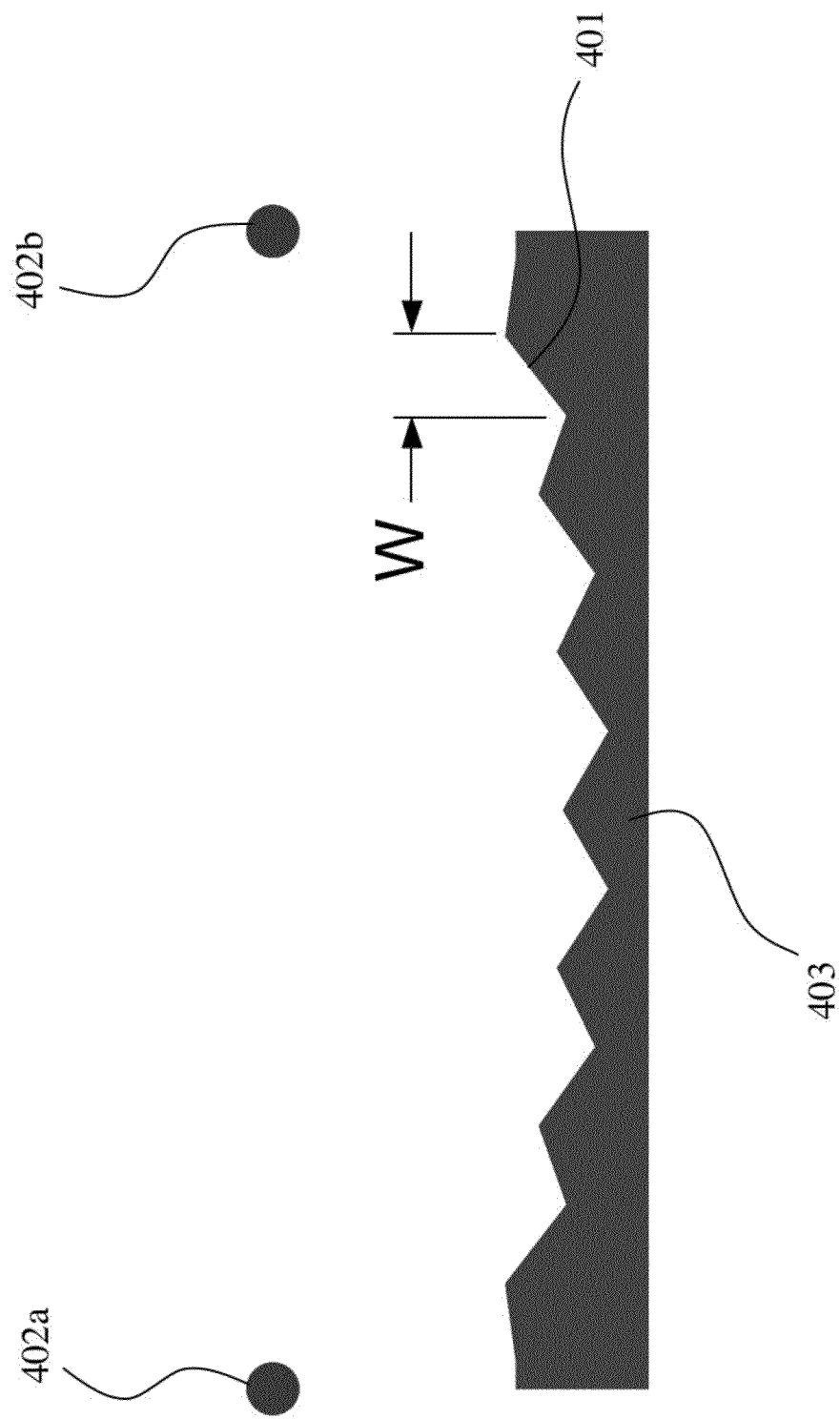
FIG. 7 is a cross-sectional diagram showing a multiple-receiver system with reflecting facets having constant width, in accordance with an example embodiment.

FIG. 7 is diagram showing a multiple-receiver system with reflecting facets having constant width, in accordance with an example embodiment. As depicted in this figure, zone 403 reflects light using reflecting facets to receivers 402a and 402b. Each of the reflecting facets (e.g., facet 401) has a constant width, w, though the height of each fact might vary, in an example embodiment. A constant width may also have manufacturing advantages in some cases. In addition, when used to collimate light in three-color systems, it may have advantages in color mixing where keeping the facet width constant facilitates keeping the color elements of uniform size and thus the resulting hue uniform. Facet height or facet width can be controlled but not both at the same time in a single facet. Of course, in an example embodiment, a reflecting system may be designed controlling both alternately, where height is controlled for some facets and width is controlled on others.

Figure 8:
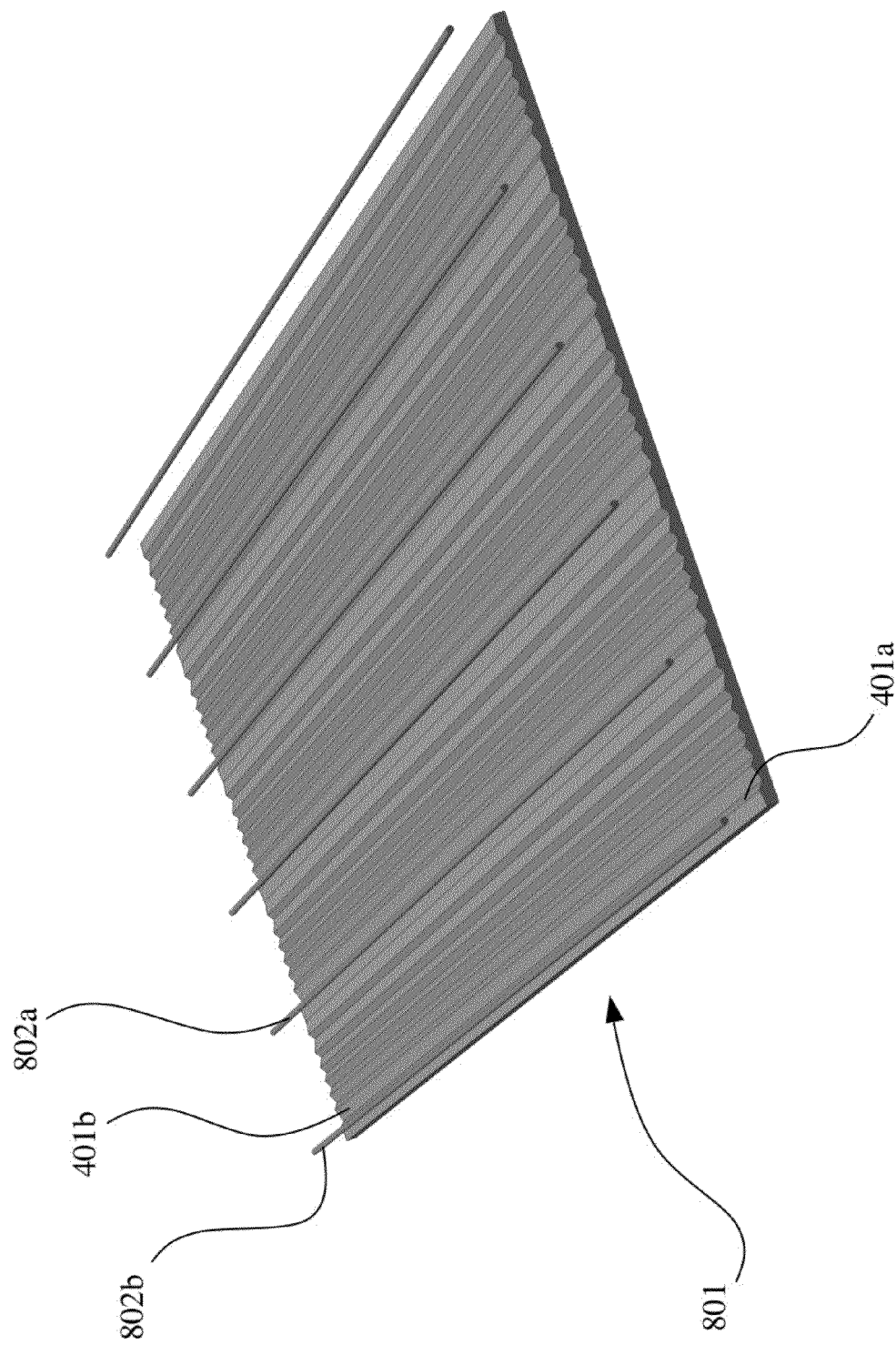
FIG. 8 is diagram showing a linear-focused system, in accordance with an example embodiment.

FIG. 8 is diagram showing a multiple-receiver system that is linear-focused, in accordance with an example embodiment. In some respects, this diagram is similar to the right-most diagram in FIG. 3, insofar as the reflecting facets are located on axes parallel to the direction of the linear receivers. As shown in FIG. 8, multiple-receiver system 801 includes opposing reflecting facets 401a and 401b. Facet 401a focuses reflected light (or other radiation such as microwave radiation or sound) on linear receiver 802a, whereas facet 401b focuses reflected light (or other radiation such as microwave radiation or sound) on linear receiver 802b. Moreover, it will be appreciated that the angles of the opposing facets 401a and 401b are designed so as to reduce or avoid facet shading. As noted earlier, example calculations for the angles which might be used with such opposing facets are included later under the heading, "ANGLE CALCULATIONS".

It should be recalled that linear receivers 802a and 802b might be light sources in an alternative example embodiment where the system generates collimated light (e.g., collimated in the plane of the cross-section shown in FIG. 8, but diffuse in the linear direction) rather than concentrated or focused light. Such an alternative example embodiment might be used in conjunction with fluorescent tubes, CCFL (Cold Cathode Fluorescent Lamps), neon tubes, linear arrays of LEDs (Light Emitting Diodes) or any other suitable linear light source.

Figure 9:
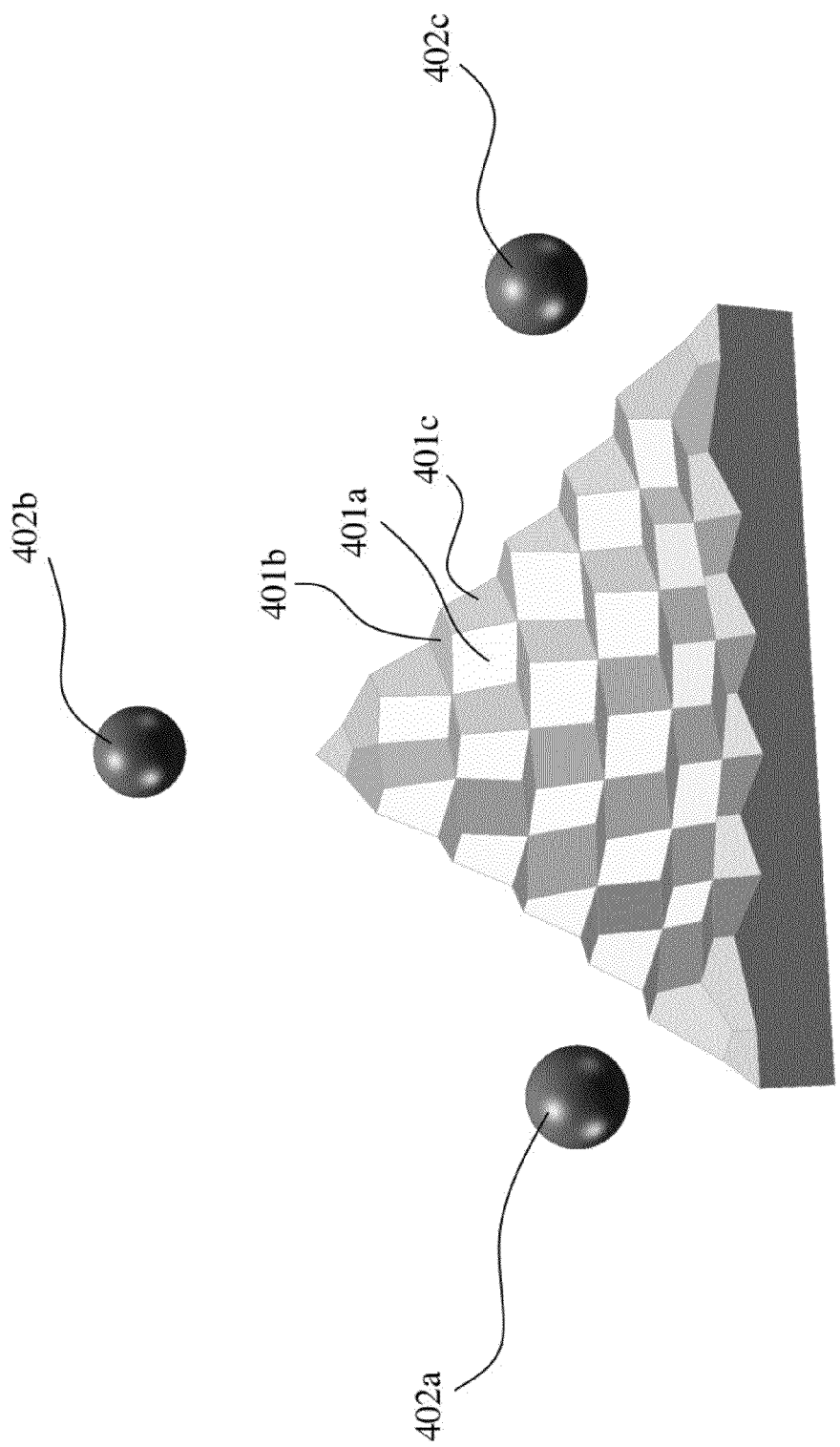
FIG. 9 is diagram showing a multiple-receiver system with three receivers per zone, in accordance with an example embodiment.

FIG. 9 is diagram showing a multiple-receiver system with three receivers per zone, in accordance with an example embodiment. As shown in this figure, zone 403 includes reflecting facets 401a, 401b, and 401c. Facet 401a focuses reflected light (or other radiation such as microwave radiation or sound) on receiver 402a, facet 401b focuses reflected light (or other radiation such as microwave radiation or sound) on receiver 402b, and facet 401c focuses reflected light (or other radiation such as microwave radiation or sound) on receiver 402c. Moreover, it will be appreciated that the angles of the reflecting facets 401a, 401b, and 401c are designed so as to reduce or avoid facet shading. As indicated above, zones can be combined to form larger systems, with adjacent zones sharing receivers, in an example embodiment. Moreover, it should be recalled that light receivers 402a, 402b, and 402c might be light sources in an alternative example embodiment where the system generates collimated light rather than concentrated or focused light.

Further, in an alternative example embodiment where 402a, 402b, and 402c are light (or other radiation) sources, the light or other radiation might converge or diverge, rather than be collimated. For example, in such an alternative example embodiment, the light (or other radiation) generated by the system might converge to an area that is (1) smaller than the reflecting surface and (2) beyond the plane containing the light sources. Or, in another alternative example embodiment, the light (or other radiation) generated by the system might diverge to an area that is (1) larger than the reflecting surface and (2) beyond the plane containing the light sources.

It will be appreciated that in example embodiments the tri-focal-point zone shown in FIG. 9 might allow for a lower angle of reflection than the system with two focal points shown in FIG. 4. And in turn, this lower angle of reflection can allow for a shorter focal height for a light receiver. In this regard, recall that reflecting facets 401a and 401b in FIG. 4 oppose each other. Therefore, the focal height for receiver 402a is designed to avoid any occlusion of reflected light by reflecting facet 401b. However, as depicted in FIG. 9, the reflecting facets do not oppose each other and consequently occlusion of reflected light can be reduced or avoided through proper placement of the light receivers, as described later under the heading, "TRI-FOCAL ZONES".

Figure 10:
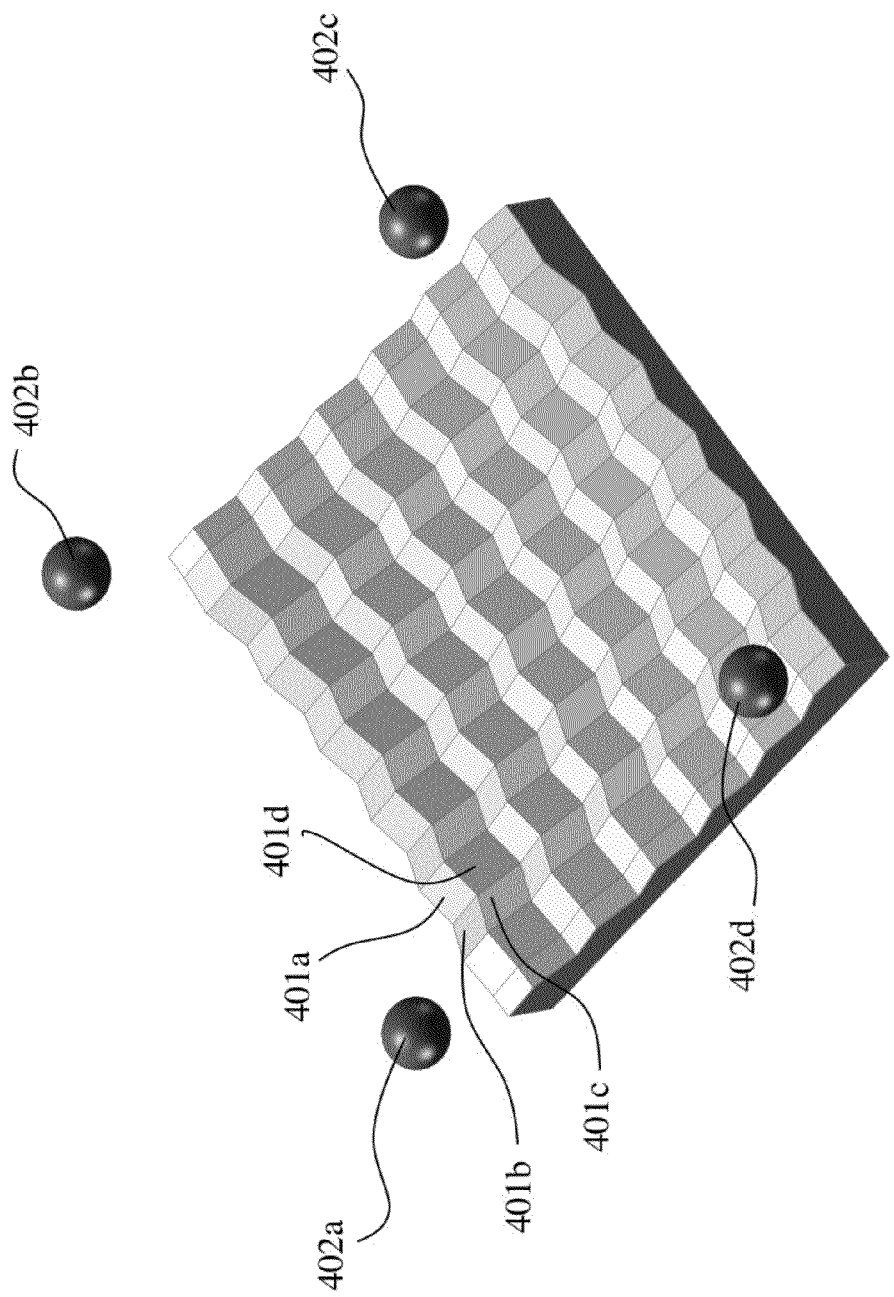
FIG. 10 is diagram showing a multiple-receiver system with four receivers per zone, in accordance with an example embodiment.

FIG. 10 is diagram showing a multiple-receiver system with four receivers per zone, in accordance with an example embodiment. As shown in this figure, zone 403 includes reflecting facets 401a, 401b, 401c, and 401d. Facet 401a focuses reflected light (or other radiation such as microwave radiation or sound) on receiver 402a, facet 401b focuses reflected light (or other radiation such as microwave radiation or sound) on receiver 402b, facet 401c focuses reflected light (or other radiation such as microwave radiation or sound) on receiver 402c, and facet 401d focuses reflected light (or other radiation such as microwave radiation or sound) on receiver 402d. Moreover, it will be appreciated that the angles of the reflecting facets 401a, 401b, 401c, and 401d are designed so as to reduce or avoid facet shading. Also, it should be recalled that light receivers 402a, 402b, 402c, and 402d might be light sources in an alternative example embodiment where the system generates collimated light rather than concentrated or focused light. As indicated above, zones can be combined to form larger systems, with adjacent zones sharing receivers, in an example embodiment.

Figure 11:
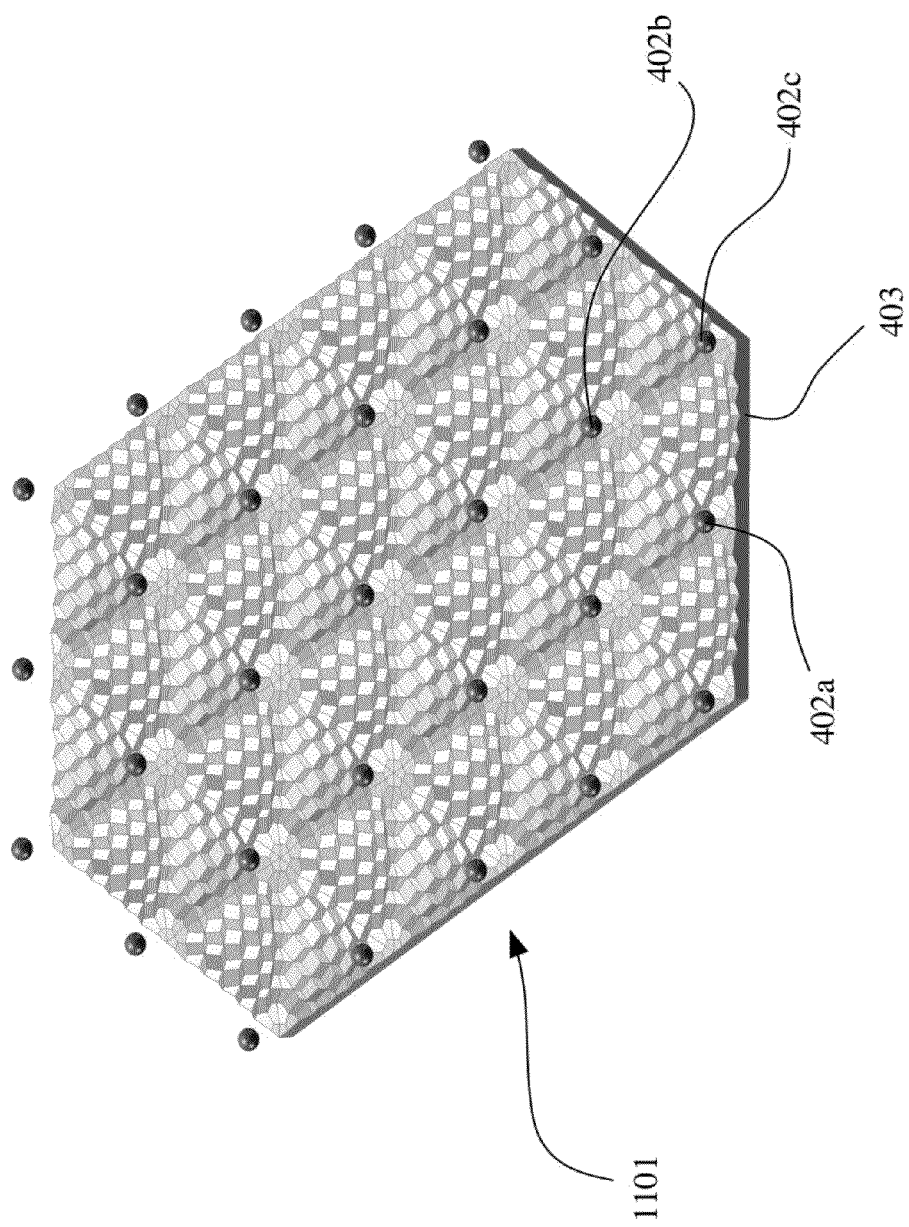
FIG. 11 is diagram showing a multiple-receiver system with tri-focal zones in a panel, in accordance with an example embodiment.

FIG. 11 is diagram showing a multiple-receiver system with tri-focal-point zones in a panel, in accordance with an example embodiment. As shown in this figure, a panel 1101 is made up of numerous tri-focal-point zones such as zone 403 whose facets reflect light (or other radiation such as microwave radiation or sound) to receivers (or focal points) 402a, 402b, and 402c. In an example embodiment, panel 1101 might consist of forty (40) or more zones. It will be appreciated that in a panel made up of tri-focal-point zones, each interior aperture is shaped like a hexagon and consists of six (6) adjacent zones. In an alternative example embodiment where each zone has four receivers (or focal points) as in FIG. 10, each interior aperture is shaped like a rectangle and consists of four (4) adjacent zones. Once again, it should be recalled that light receivers 402a, 402b, 402c, etc., might be light sources in an alternative example embodiment where the system generates collimated light rather than concentrated or focused light.

Figure 12:
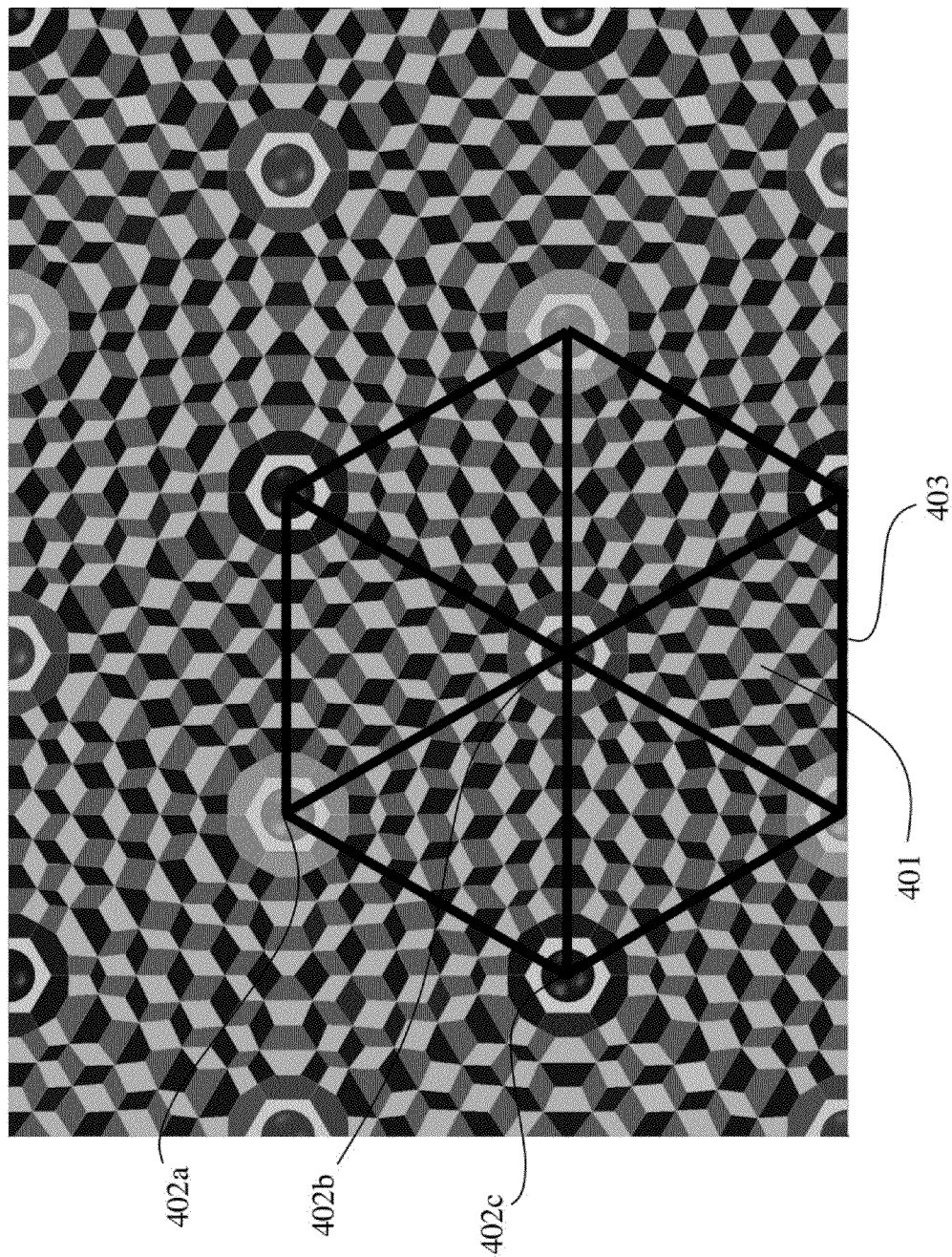
FIG. 12 is shaded diagram showing a multiple-receiver system with tri-focal zones, in accordance with an example embodiment.

FIG. 12 is shaded diagram showing a multiple-receiver system with tri-focal-point zones, in accordance with an example embodiment. In this figure, each zone (e.g., zone 403) includes three receivers (e.g., receiver 402a, 402b, and 402c), each of which receives light (or other radiation such as microwave radiation or sound) from reflecting facets (e.g., reflecting facet 401). To show how the reflections are distributed among the receivers, each of the receivers and reflecting facets has been shaded. As in the prior figure, six adjacent zones surround each focal point, forming a hexagon, and each of these zones focuses one-third of its reflecting facets on that focal point. The lines interior to the hexagon traverse the reflecting facets that focus light (or other radiation such as microwave radiation or sound) on receiver 402b, which is located at the intersection of those lines.

It will be appreciated that in an alternative example embodiment in which the light receivers in FIG. 12 are light sources, the light source 402a might radiate a green light, the light source 402b might radiate a blue light, and the light source 402c might radiate a red light. Such an alternative example embodiment might be used to create collimated light of any color which could take the place of filtered lighting. So using this example embodiment, gels for theatrical lighting might be replaced with simple lighting panels that are color-selectable from a control console.

Figure 13:
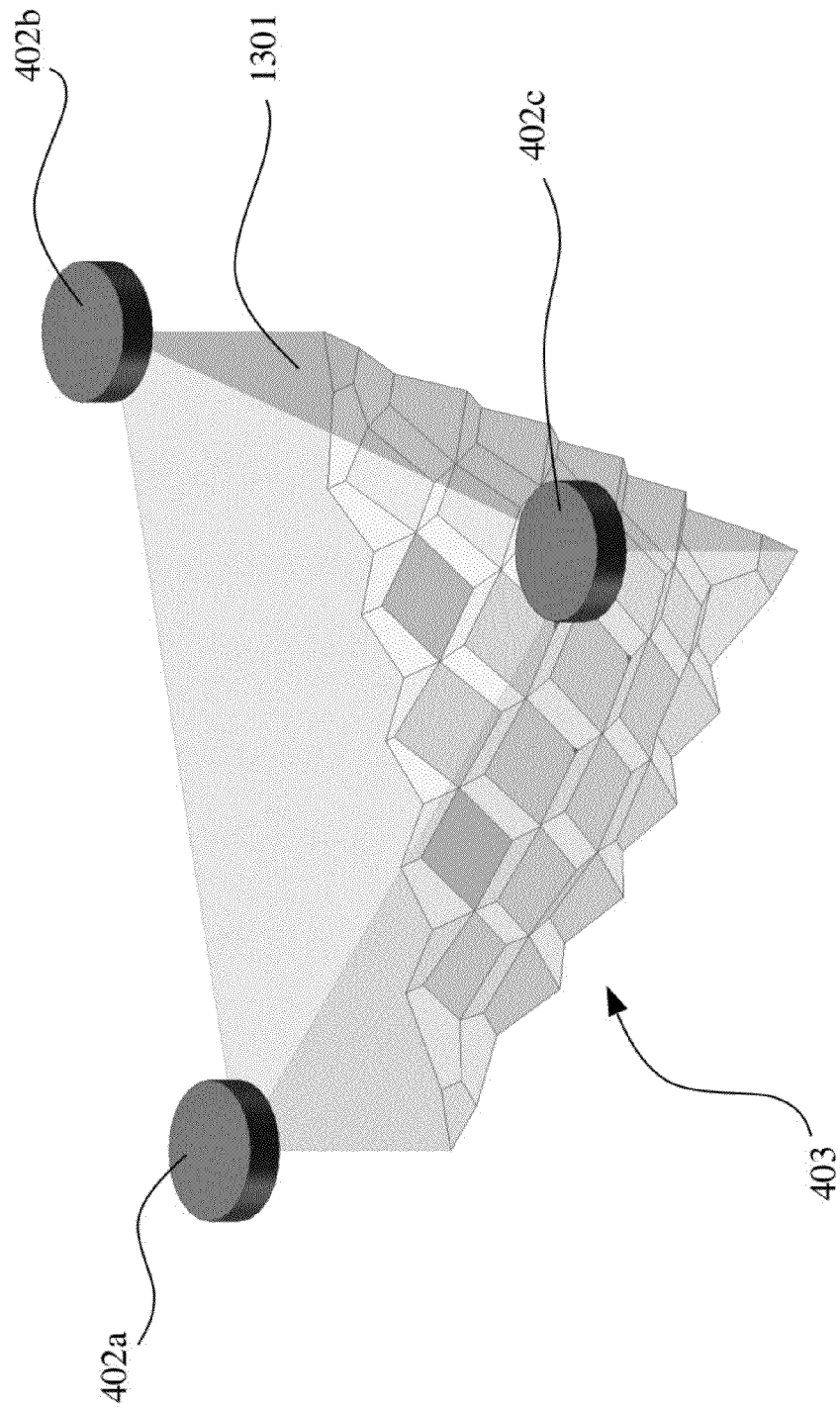
FIG. 13 is diagram showing a multiple-receiver system with three receivers located on a transparent body in a zone, in accordance with an example embodiment.

FIG. 13 is diagram showing a multiple-receiver system with three receivers located on a transparent body in a zone, in accordance with an example embodiment. As shown in this figure, a zone 403 includes receivers 402a, 402b, and 402c located on a top surface of a transparent body 1301, whose bottom surface has been processed to create reflecting (or mirrored) facets. It will be appreciated that the height of the receivers 402a, 402b, and 402c is approximately the thickness of the transparent body 1301. In an example embodiment, the transparent body 1301 might be approximately 3.5 mm thick and a side of zone 403 might be approximately 10 mm long and include approximately 56 reflecting facets. In an example embodiment, such reflecting facets might be created by molding or forming the bottom surface of a large sheet and then coating it with a reflective material (such as silver or aluminum). In alternative example embodiments, other suitable means of manufacture, such as embossing or cutting the bottom surface of the sheet, might be employed. During subsequent processing, the receivers can be affixed directly to the top surface of the sheet at the focal points, using index-matching adhesives that assure an optically-efficient coupling of the reflected radiation to the surface of the receivers. However, in alternative example embodiments, a panel might be assembled from individual zones, rather than a sheet.

Figure 14:
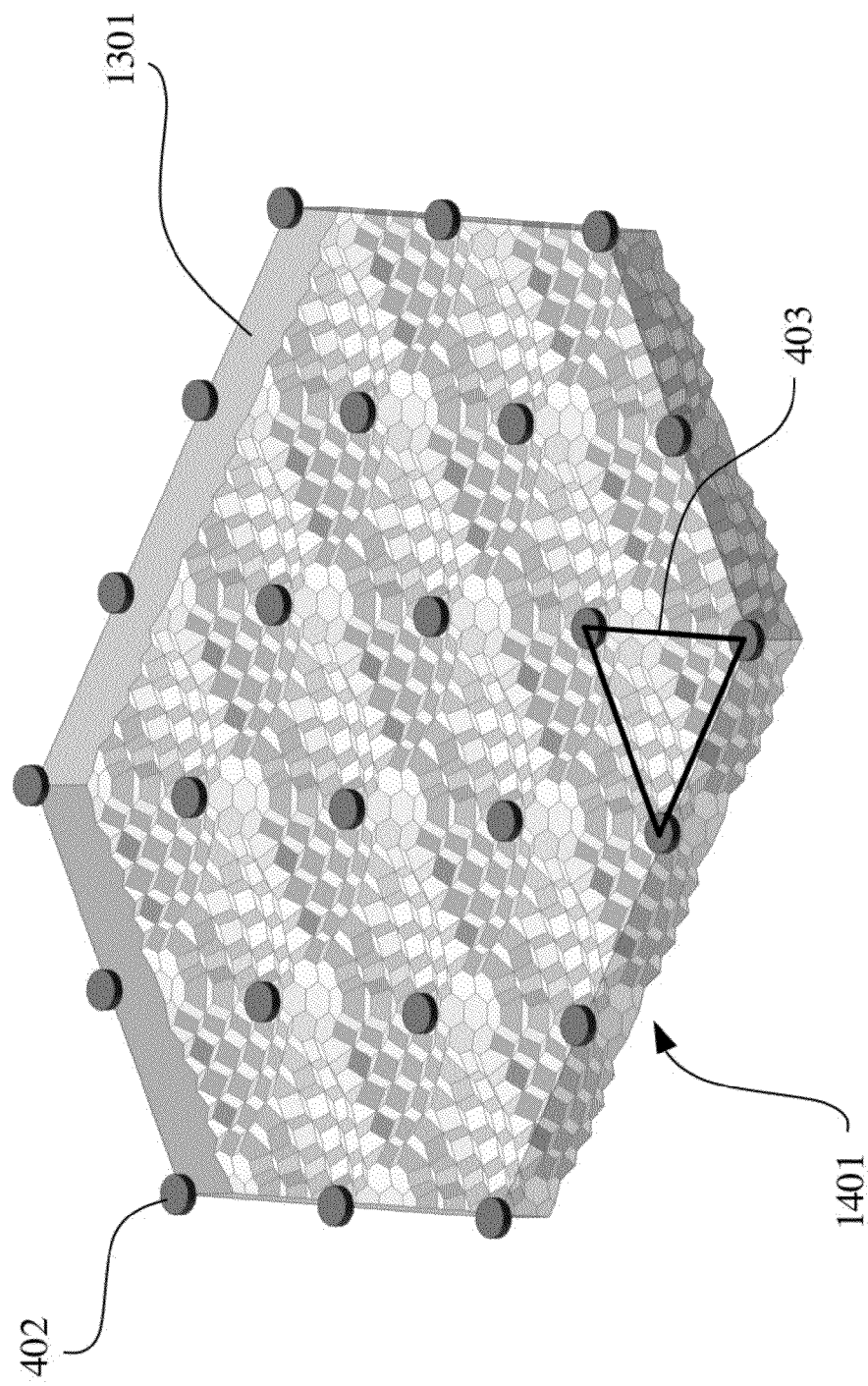
FIG. 14 is diagram showing a multiple-receiver system with tri-focal zones in a panel having a transparent body, in accordance with an example embodiment.

FIG. 14 is diagram showing a multiple-receiver system with tri-focal zones in a panel having a transparent body, in accordance with an example embodiment. As shown in this figure, a panel 1401 includes a number of zones (such as zone 403), each of which includes three receivers (such as receiver 402) affixed to a transparent body 1301, as described in the preceding figure. It will be appreciated that panel 1401 might be manufactured using the techniques and materials previously described (e.g., molding the bottom surface of a transparent sheet, coating the bottom surface with a reflective material, and then affixing receivers to the top surface using an adhesive).

Figure 15:
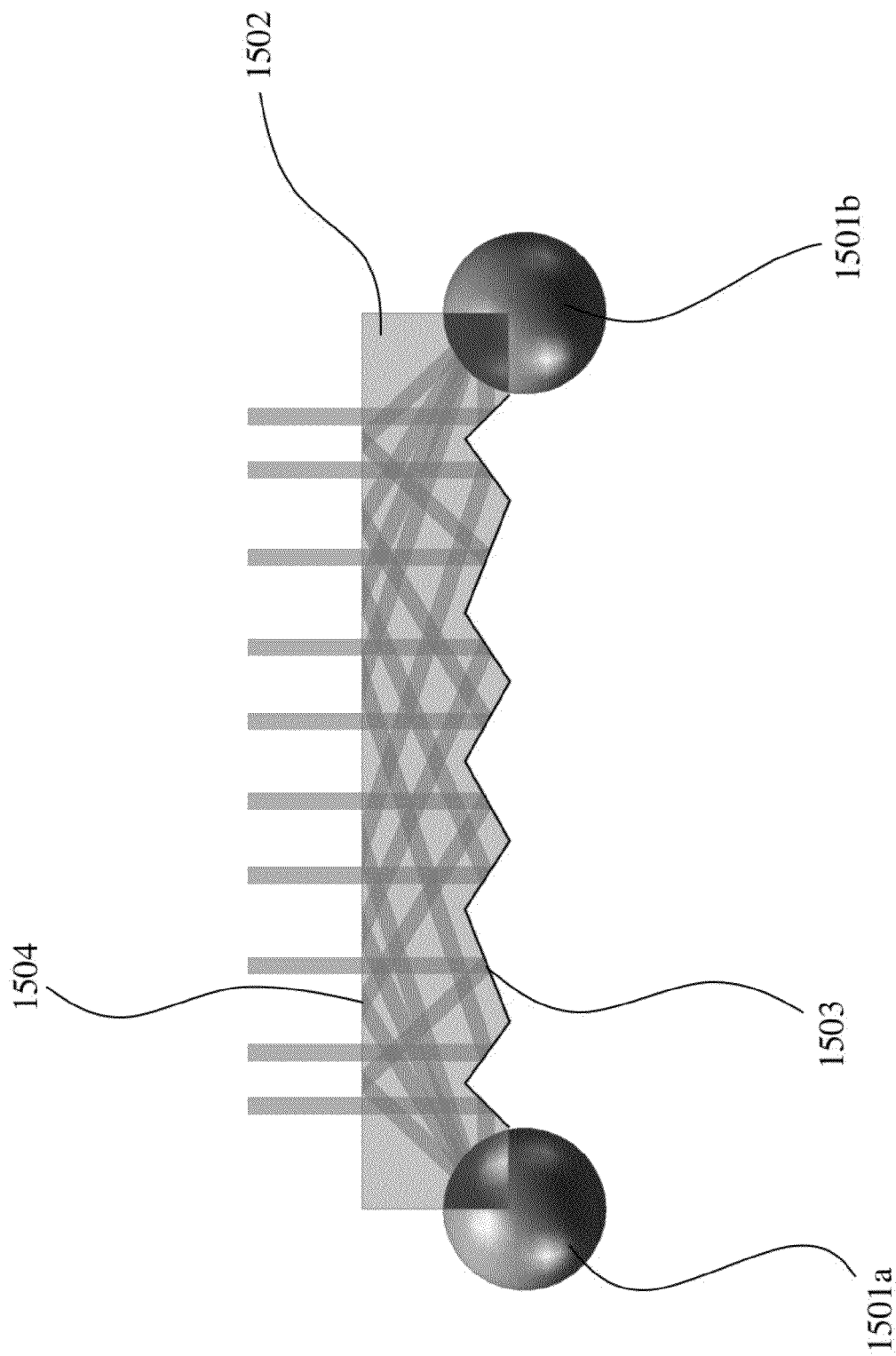
FIG. 15 is a cross-sectional diagram showing a multiple-receiver system with a transparent body that uses internal reflection, in accordance with an example embodiment.

FIG. 15 is diagram showing a multiple-receiver system with a transparent body that uses internal reflection, in accordance with an example embodiment. As shown in this figure, two receivers 1501a and 1501b are affixed to the bottom surface 1503, rather than the top surface, of a transparent body 1502. The bottom surface 1503 also includes a number of reflecting facets that can reflect light to the top surface 1504 of the transparent body 1502, where the light is then internally reflected to a receiver (e.g., receiver 1501a). Also, as shown in this figure, the reflecting facet closest to each receiver is angled to reflect directly to the receiver without the use of internal reflection, since such internal reflection might not be possible given the material used to create the transparent body 1502.

It will be appreciated that by "folding" the focal distance through internal reflection, the thickness of the transparent body 1502 can be reduced from approximately one-sixth of the size of the aperture (as defined above) to approximately one-twelfth of the size of the aperture, in an example embodiment. Furthermore, for a particular thickness, internal reflection allows for zones with larger area resulting in fewer receivers/area. Also, using internal reflection, the receivers can be mounted on the bottom surface of the transparent body 1502, which prevents receivers and electrical interconnection from shading the path of illumination from the external light source.

In an example embodiment, each of the receivers in FIG. 15 might be a spherical photovoltaic cell (PVC), as indicated in the figure. Spherical PVCs tend to be relatively inexpensive in comparison to flat PVCs of equivalent surface area. However, an alternative example embodiment might use flat PVCs, alone or in combination with spherical PVCs. It will be appreciated that PVCs typically include a means for electrical interconnection and a means to reject absorbed heat, such as a heat sink. In alternative example embodiments, other suitable means might be employed for both functions.

Figure 16:
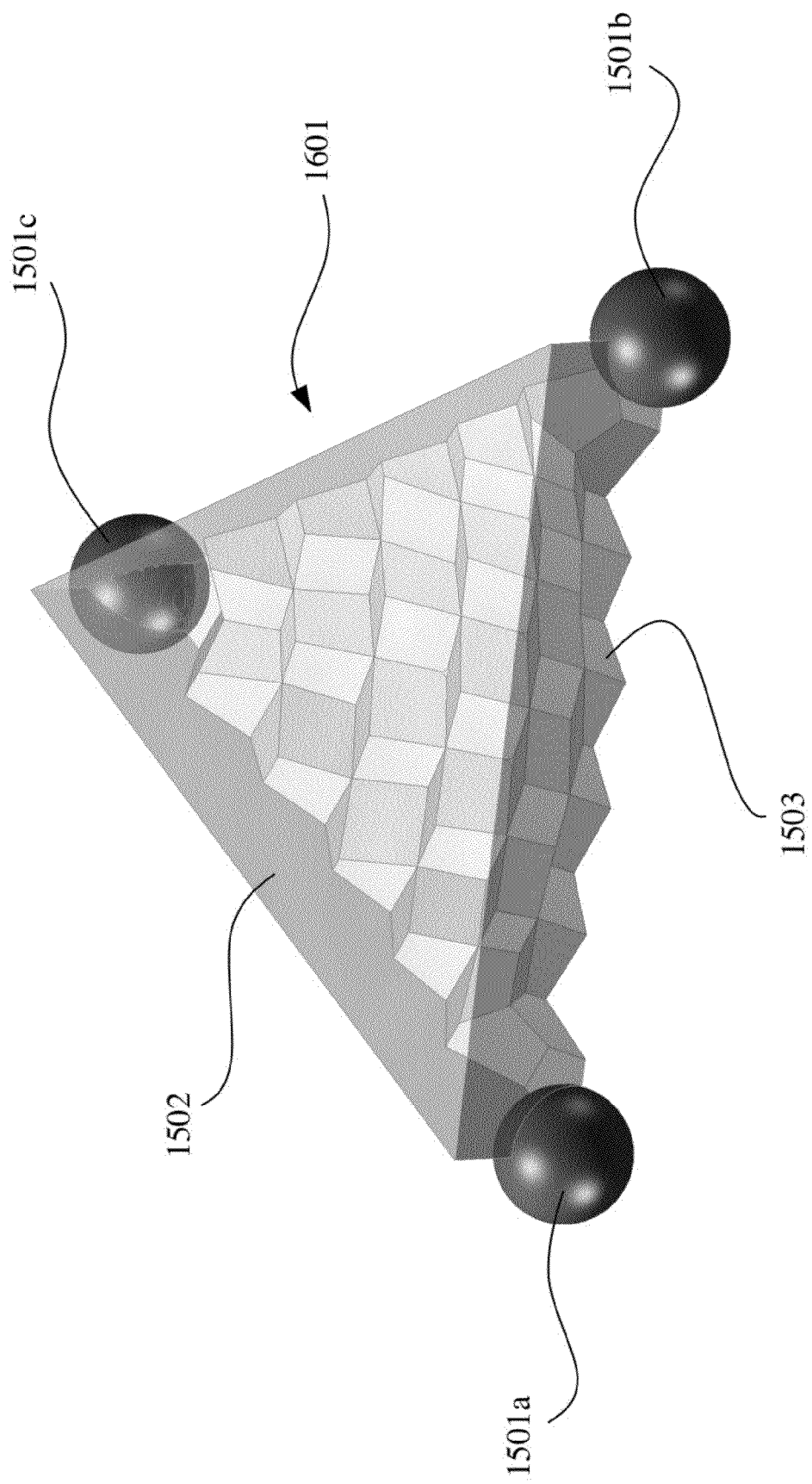
FIG. 16 is diagram showing a multiple-receiver system with a tri-focal zone and a transparent body that uses internal reflection, in accordance with an example embodiment.

FIG. 16 is diagram showing a multiple-receiver system with a tri-focal-point zone and a transparent body that uses internal reflection, in accordance with an example embodiment. As shown in this figure, a tri-focal-point zone 1601 includes three receivers 1501a, 1501b, and 1501c affixed to a transparent body 1502 whose bottom surface 1503 includes a number of reflecting facets and whose top surface allows for internal reflection of light (or other radiation such as microwave radiation or sound) as described above. In an example embodiment, receivers 1501a, 1501b, and 1501c might be spherical PVCs, as also described above.

Figure 17:
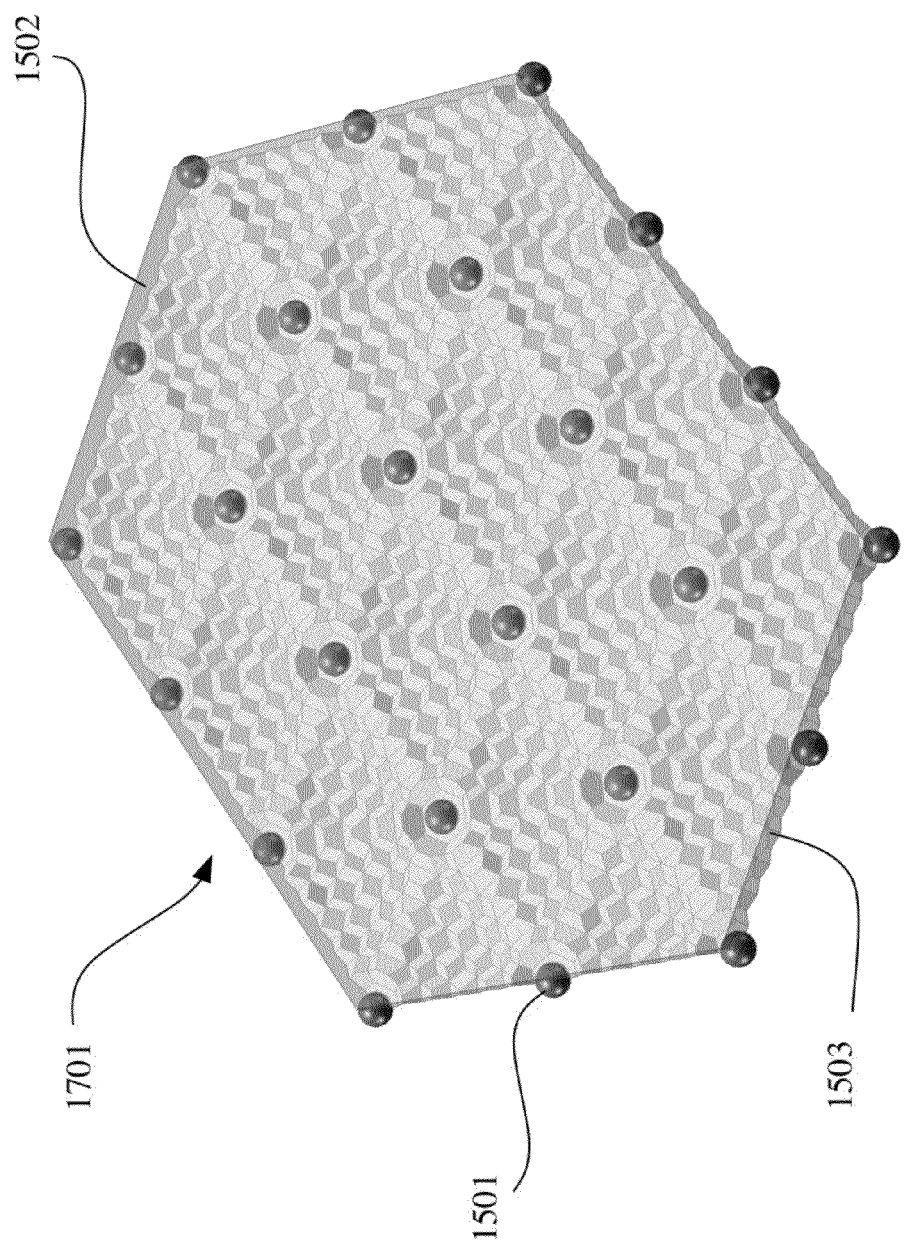
FIG. 17 is diagram showing a multiple-receiver system with tri-focal zones in a panel having a transparent body that uses internal reflection, in accordance with an example embodiment.

FIG. 17 is diagram showing a multiple-receiver system with tri-focal-point zones in a panel having a transparent body that uses internal reflection, in accordance with an example embodiment. As shown in this figure, panel 1701 is made up of tri-focal-point zones, each of which contains three receivers such as receiver 1501 affixed to a transparent body 1502 whose bottom surface 1503 includes a number of reflecting facets and whose top surface allows for internal reflection of light (or other radiation such as microwave radiation or sound) as described above. It will be appreciated that adjacent zones share receivers, as earlier described. In an example embodiment, the receivers such as receiver 1501 might be spherical PVCs, as also described above. As described in greater below, the light receivers might be light sources in an alternative example embodiment where the system generates collimated light rather than concentrated or focused light.

Figure 18:
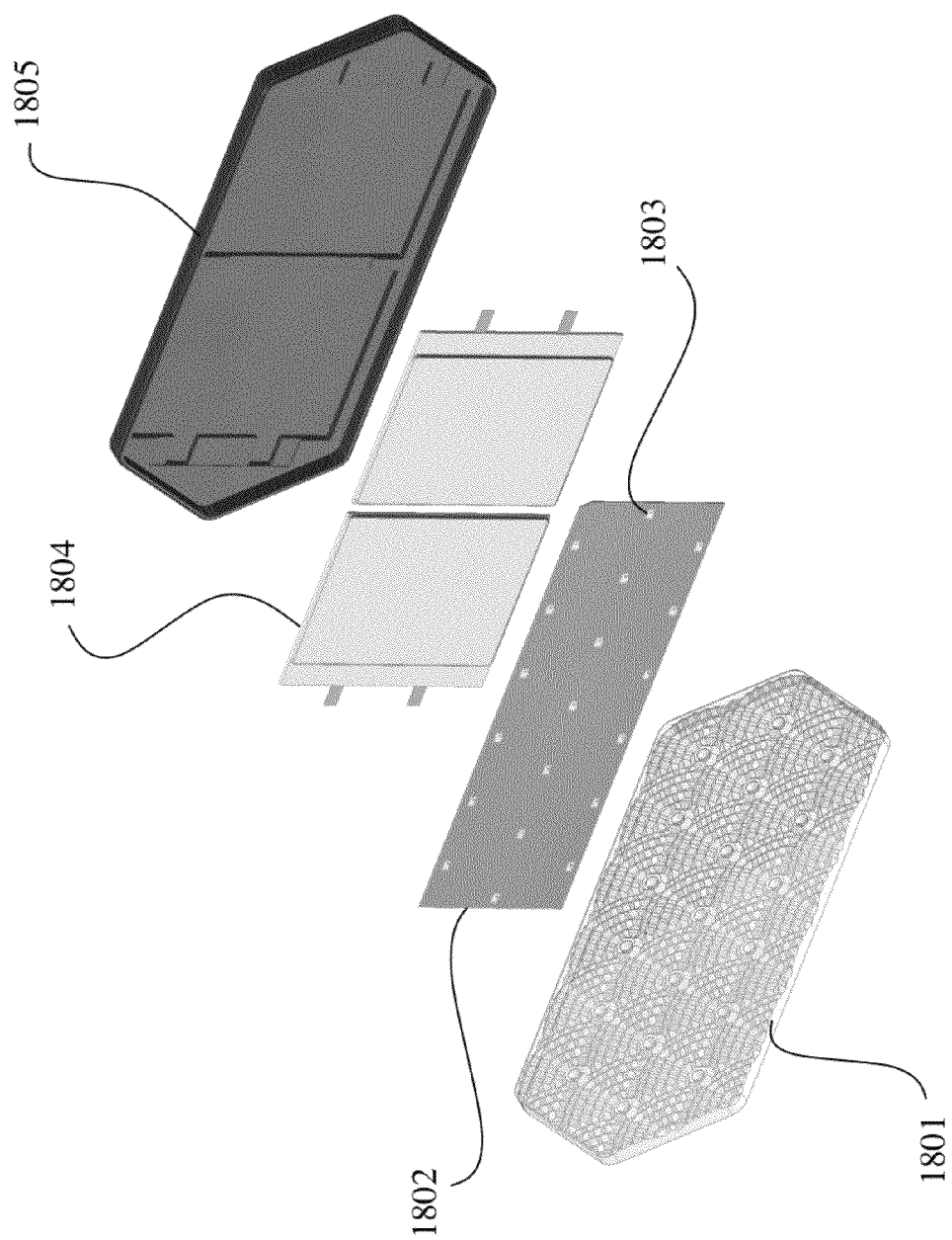
FIG. 18 is diagram showing the components of a thin lamp (e.g., a flashlight) that uses internal reflection, in accordance with an example embodiment.

FIG. 18 is diagram showing the components of a thin lamp (e.g., a flashlight) that uses internal reflection, in accordance with an example embodiment. As shown in this figure, those components include a reflector 1801 and a printed circuit board (PCB) 1802 with an array of light-emitting diodes (LEDs) such as LED 1803. It will be appreciated that the reflector 1801 and the PCB 1802 can be combined to form a panel similar to the panel shown in the prior figure, though the panel in FIG. 18 uses light sources (e.g., LEDs) rather than light receivers. It will be appreciated that numerous other light sources might be used in place of LEDs in alternative example embodiments, for example organic LEDs. The two other components shown in FIG. 18 are the batteries 1804 and the housing shell 1805. When all of the components are assembled they form a thin or ultra-thin lamp, which might be more compact and less expensive to manufacture than currently marketed lamps. Further, it will be appreciated that the lamp shown in FIG. 18 might be particularized with some modification (e.g., as to the thickness of the assembled lamp) in various implementations to be a flashlight, a floodlight, a spotlight, a headlight, a traffic light, room lighting, etc.

Figure 19:
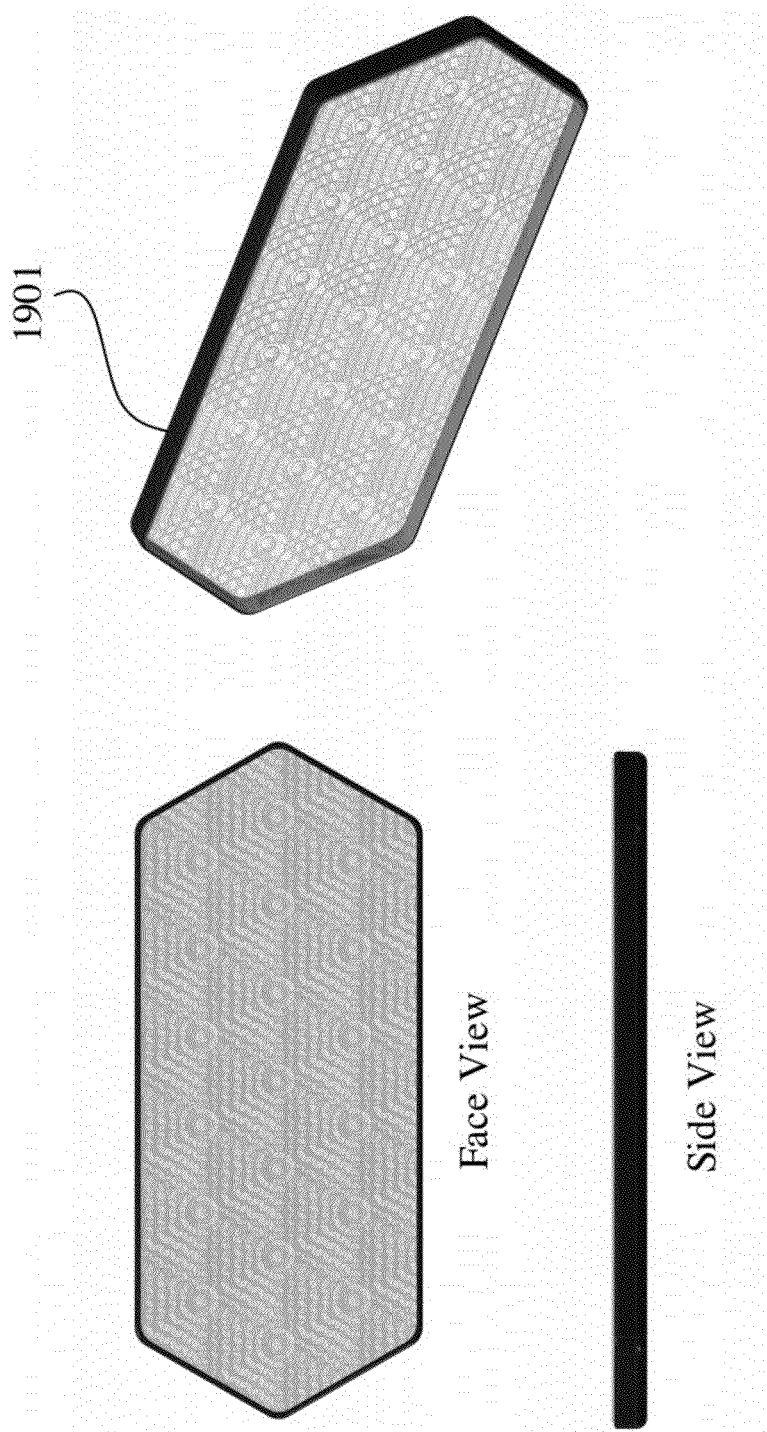
FIG. 19 is diagram showing an assembled thin lamp (e.g., a flashlight) that uses internal reflection, in accordance with an example embodiment.

FIG. 19 is diagram showing an assembled thin lamp (e.g., a flashlight) that uses internal reflection, in accordance with an example embodiment. As shown in this figure, a lamp 1901 is assembled from the components depicted in the prior figure. The side view of the lamp 1901 illustrates the thinness of the lamp. The face view of the lamp 1901 is similar to the panel shown in FIG. 17. Using a thin sheet reflector (e.g., the reflector 1801 in FIG. 18), an array of LEDs on a thin PCB (e.g., PCB 1802 in FIG. 18), and thin lithium polymer cells (e.g., batteries 104 in FIG. 18), and a thin housing shell, a flashlight can be produced that is less than approximately 4 mm thick, in an example embodiment.

At the other end of the size spectrum from thin flashlights are heliostat arrays. Scaling the reflecting facets in the tri-focal-point system described above to a heliostat array, the angle of each heliostat mirror can match the angle of a reflecting facet in a tri-focal-point reflector. However, as noted above, each of the heliostat mirrors in an array individually tracks the movement of the sun so as to maintain focus on a receiver. Thus, for example, if the sun were to move from normal by a certain angle in any direction, each heliostat mirror might also tilt in the same direction (e.g., by one-half the angle) to compensate and keep the reflected sunlight on a receiver.

In example embodiments, each of the heliostat mirrors in the array might change angle similarly to compensate for the change in the position of the sun and therefore behave as a dynamic version of the tri-focal-point system described above. By way of example and not limitation, the tracking might be simplified by combining the heliostat mirrors in clusters of three and tracking the three heliostat mirrors as one unit. Such heliostat units might have unique relative angles between each other depending on a unit's position in a zone. But the relative angular difference from one position to another position of a unit would not be great (e.g., approximately +/−8.5 degrees). Therefore uniform hardware could be used for each unit, with a small tracking offset (e.g., approximately +/−8.5 degrees) for adjustments to the relative angles of each heliostat mirror.

In such an example embodiment, the hardware might include a gimbal-guided roll/pitch mechanism rather than an azimuth-elevation mechanism since the latter might entail additional clearance between heliostats to prevent collisions. Assuming a gimbal-guided roll/pitch mechanism, the maximum angular offset of a heliostat mirror might be +/−45 degrees in either the roll or pitch direction from an initial position, where the initial position is determined by a combination of relative angular difference and tracking offset. Then in a worst-case position, tracking offset might be approximately 20 degrees, so the total angular offset in the hardware would be approximately +/−65 degrees from an initial position.

It will be appreciated that such an example embodiment would allow for the use of uniform hardware in each heliostat unit, though alternative example embodiments with uniform hardware might employ other roll/pitch mechanisms or azimuth-elevation mechanisms.

Figure 20:
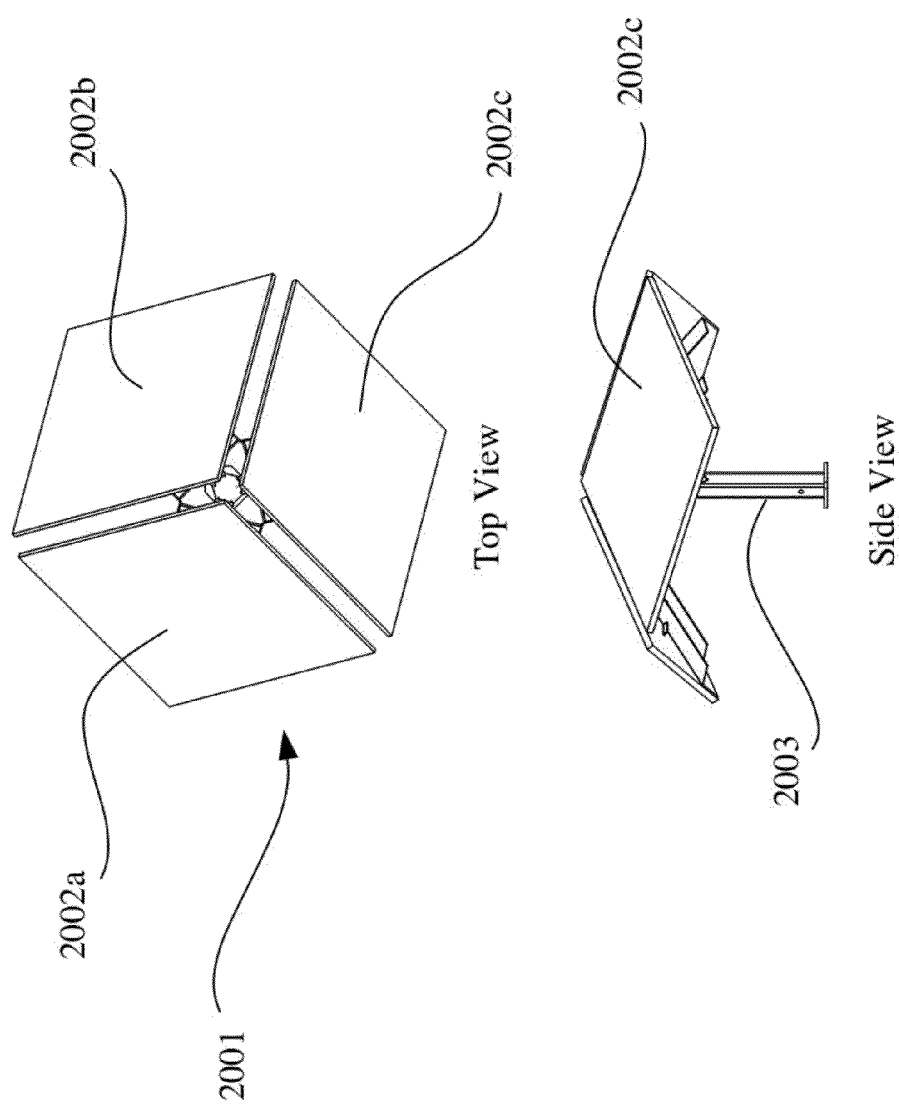
FIG. 20 is diagram showing a heliostat unit, in accordance with an example embodiment.

FIG. 20 is diagram showing a heliostat unit, in accordance with an example embodiment. As depicted in the top view shown in this figure, the heliostat unit 2001 includes three mirrors 2002a, 2002b, and 2002c with an approximate 112°-68° rhombic (diamond) shape. They are connected to a roll/pitch mechanism, which is visible in the side view of the heliostat unit 2001. As depicted in these views, the three mirrors 2002a, 2002b, and 2002c are fixed relative to each other but are gimbaled as a unit on a foundation post 2003. And relative to the foundation post 2003, the three mirrors 2002a, 2002b, and 2002c are controlled in roll and pitch by the roll/pitch mechanism. The roll/pitch mechanism is not shown in this figure. Numerous suitable means for such a roll/pitch mechanism are well known by persons of ordinary skill in the art.

Figure 21:
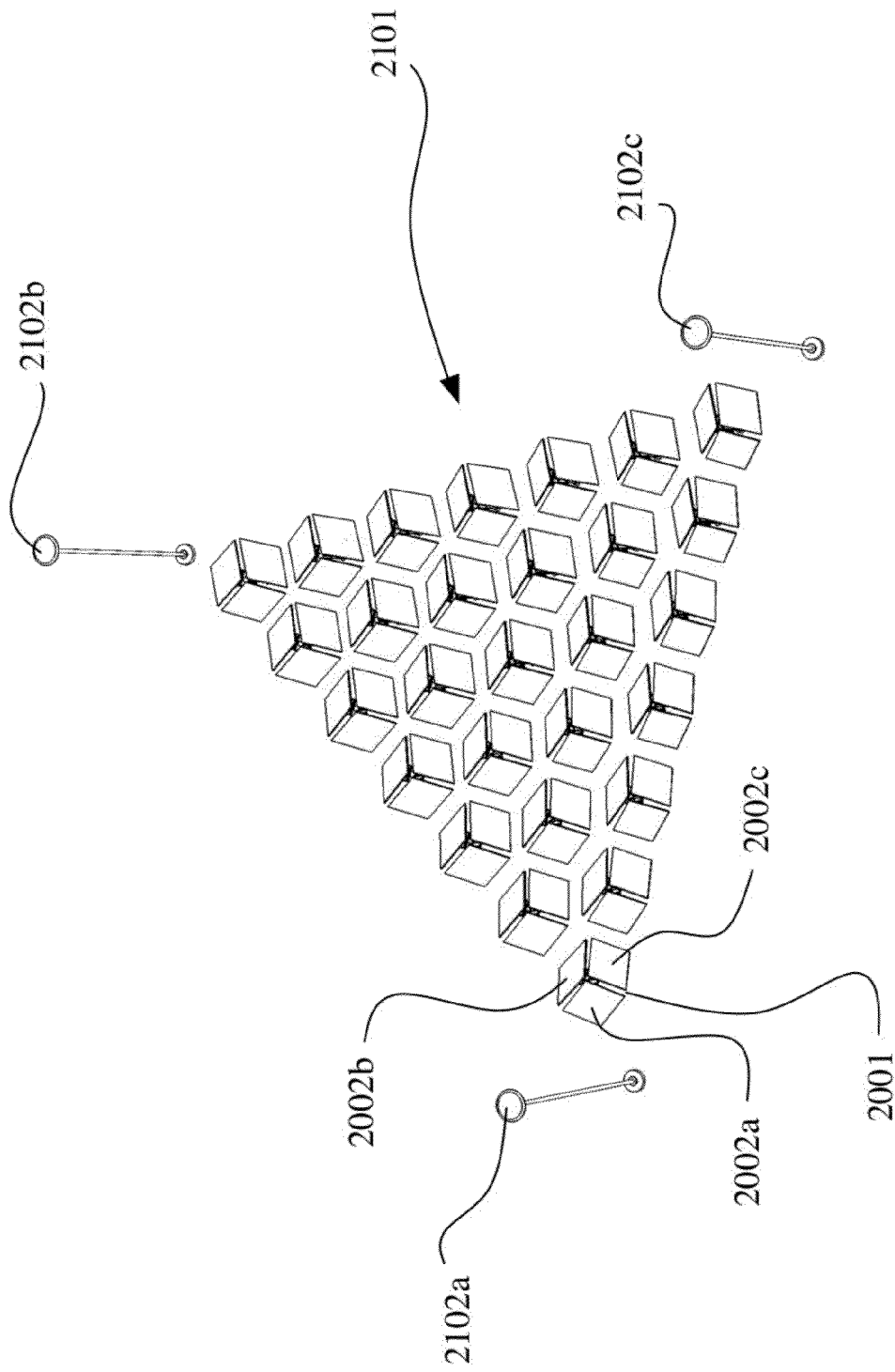
FIG. 21 is diagram showing a heliostat zone with units having three mirrors, in accordance with an example embodiment.

FIG. 21 is diagram showing a heliostat zone with units having three mirrors, in accordance with an example embodiment. As shown in this figure, heliostat zone 2101 includes a number of heliostat units such as heliostat unit 2001, similar to the heliostat unit described in the previous figure. In turn, heliostat unit 2001 includes three mirrors 2002a, 2002b, and 2002c. Mirror 2002a focuses reflected sunlight on receiver (or tower) 2102a, mirror 2002b focuses reflected sunlight on receiver 2102b, and facet 2002c focuses reflected sunlight on receiver 2102c. In an example embodiment, a zone 2101 might be an equilateral triangle, approximately 70 feet on a side. Also in an example embodiment, each receiver (or tower) 2102a, 2102b, and 2102c might be approximately 23 feet tall.

It will be appreciated that the angles of the mirrors 2002a, 2002b, and 2002c are designed so as to reduce or avoid facet shading. Also, it will be appreciated that zones can be combined to form larger systems, with adjacent zones sharing receivers, in an example embodiment.

Figure 22:
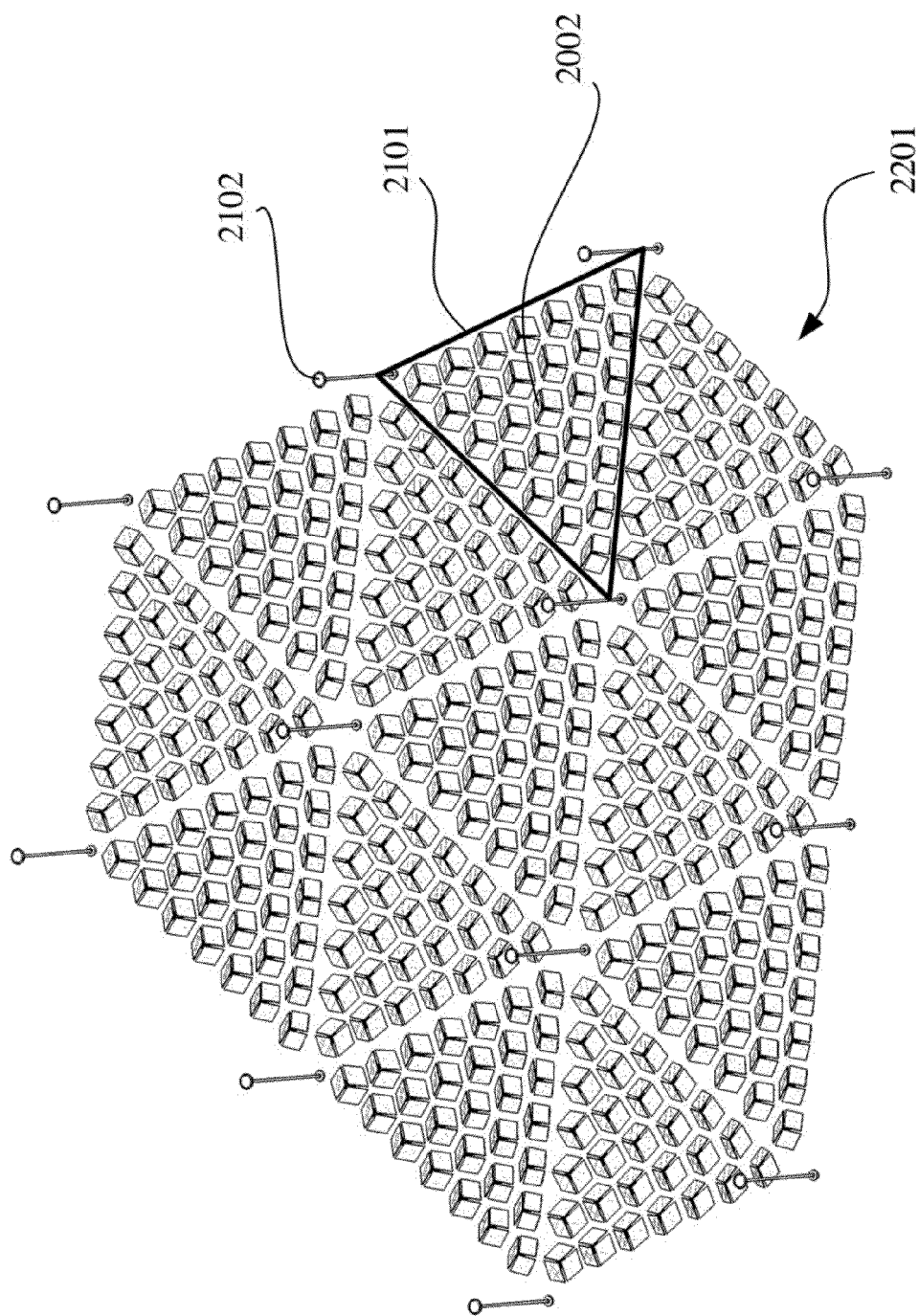
FIG. 22 is diagram showing a heliostat array with zones composed of units having three mirrors, in accordance with an example embodiment.

FIG. 22 is diagram showing a heliostat array with zones composed of units having three mirrors, in accordance with an example embodiment. As shown in FIG. 22, a heliostat array 2201 is made up of a number of tri-focal-point zones. As noted in the description of the prior figure, each of these zones (such as zone 2101) includes mirrors (such as mirror 2002) that reflect sunlight to receivers (such as receiver 2102). Also as noted previously, the angles of the mirrors are designed so as to reduce or avoid facet shading.

Figure 23:
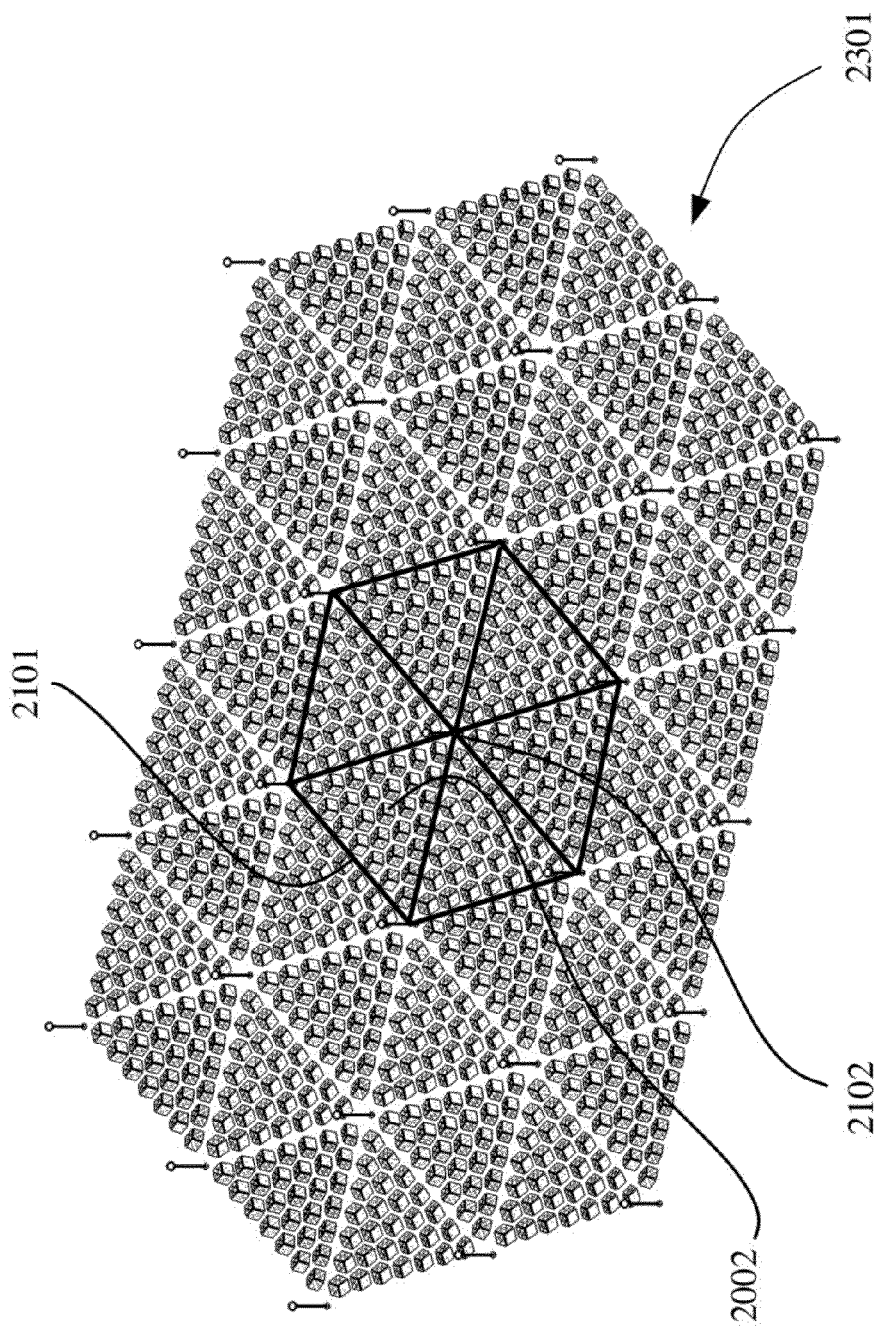
FIG. 23 is diagram showing a heliostat field with zones composed of units having three mirrors, in accordance with an example embodiment.

FIG. 23 is diagram showing a heliostat field with zones composed of units having three mirrors, in accordance with an example embodiment. This figure is similar to FIG. 11, which describes the tri-focal-point zones in a reflective panel. As shown in FIG. 23, six adjacent zones (such as zone 2101) surround each receiver (such as receiver 2102), forming a hexagon. And each of these zones focuses one-third of its mirrors (such as mirror 2002) on that receiver. It will be appreciated that a heliostat field can be continuously enlarged in a modular fashion and that as the number of zones increases, the percentage of fully populated receiver positions also increases. In an example embodiment, a heliostat field might cover two or more acres.

Angle Calculations

Figure 24A:
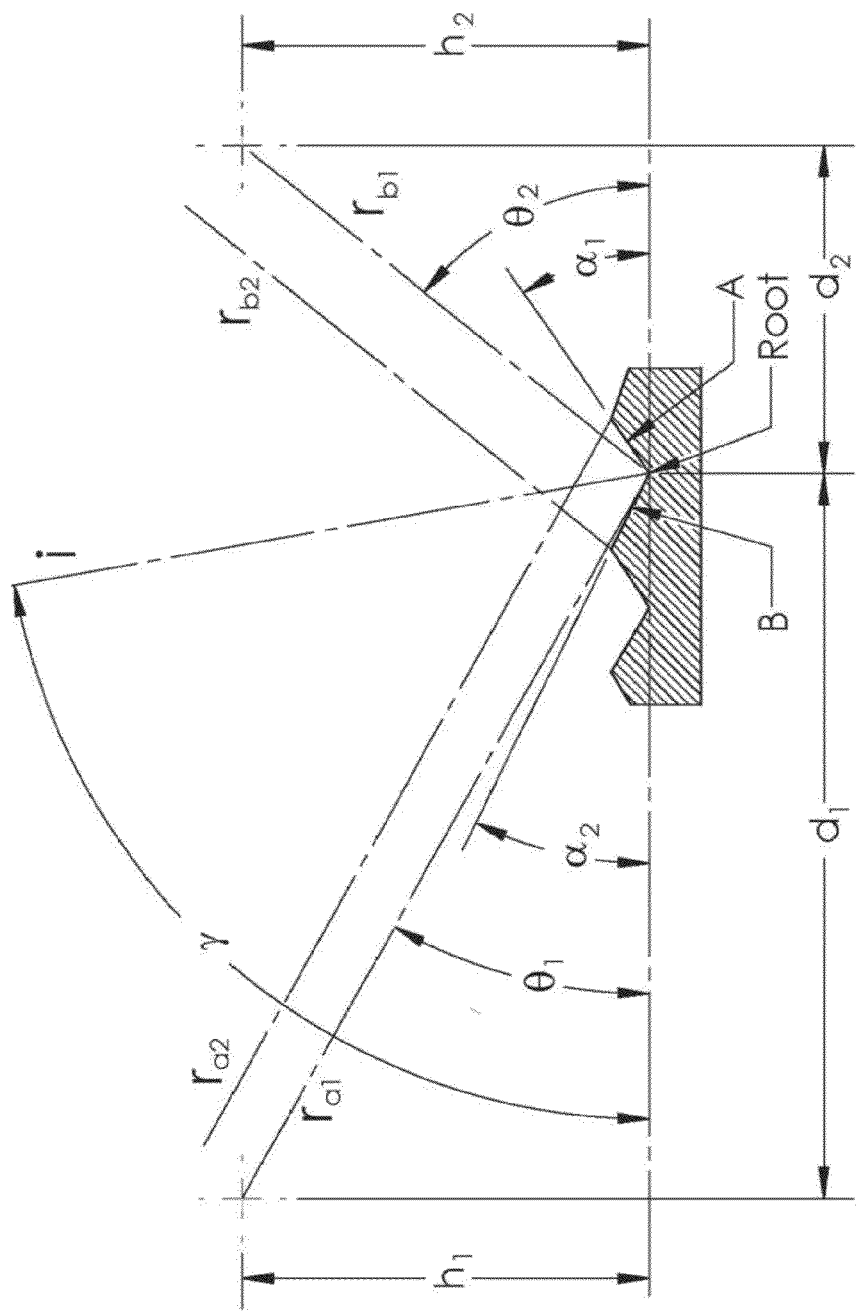

FIGS. 24A, 24B, 24C, 24D are diagrams describing an example calculation of angles for opposing facets. FIG. 24A shows a representative cross-section 2401, from a Fresnel reflector, with opposing reflecting facets A and B, whose surfaces are flat rather than parabolic. Design angle γ is the expected angle of incident rays illuminating the Fresnel reflector, which in this case, focuses or concentrates light (or other radiation such as microwave radiation or sound). In an alternative example embodiment involving collimated light, design angle γ might be the angle of collimated rays projected from the Fresnel reflector. The design angle γ is usually normal to the plane of the reflector (e.g., 90 degrees), though it can be set at any angle between $\alpha_1$ and $\alpha_2$.

Reflecting facet A is tilted at angle $\alpha_1$ and reflects (or projects) incident rays to focal region $F_1$ at angle $\theta_1$. Reflecting facet B is tilted at angle $\alpha_2$ and reflects (or projects) incident rays to focal region $F_2$ at $\theta_2$. Consider an incident ray represented by line i, which strikes at the root of opposing reflecting facets A and B, which is the lowest point on each facet. As shown in the figure, the lowest point on facet A reflects along line $r_{a1}$ and reaches height $h_1$, at distance $d_1$. Similarly, the lowest point on facet B reflects along line $r_{b1}$ and reaches height $h_2$, at distance $d_2$. Focal region $F_1$ is bounded by the ray $r_{a1}$ and its parallel ray $r_{a2}$. Focal region $F_2$ is bounded by the ray $r_{b1}$ its parallel ray $r_{b2}$. In an example embodiment, heights $h_1$ and $h_2$ are equal in length, but can differ in height in alternative example embodiments. It will be appreciated that in order to reduce or avoid cosine loss in an example embodiment, the relationship between these heights and distances will be such that $\alpha_1$ is less than $\theta_2$ and $\alpha_2$ is less than $\theta_1$, for each pair of opposing reflecting facets in the Fresnel reflector.

Figure 24B:
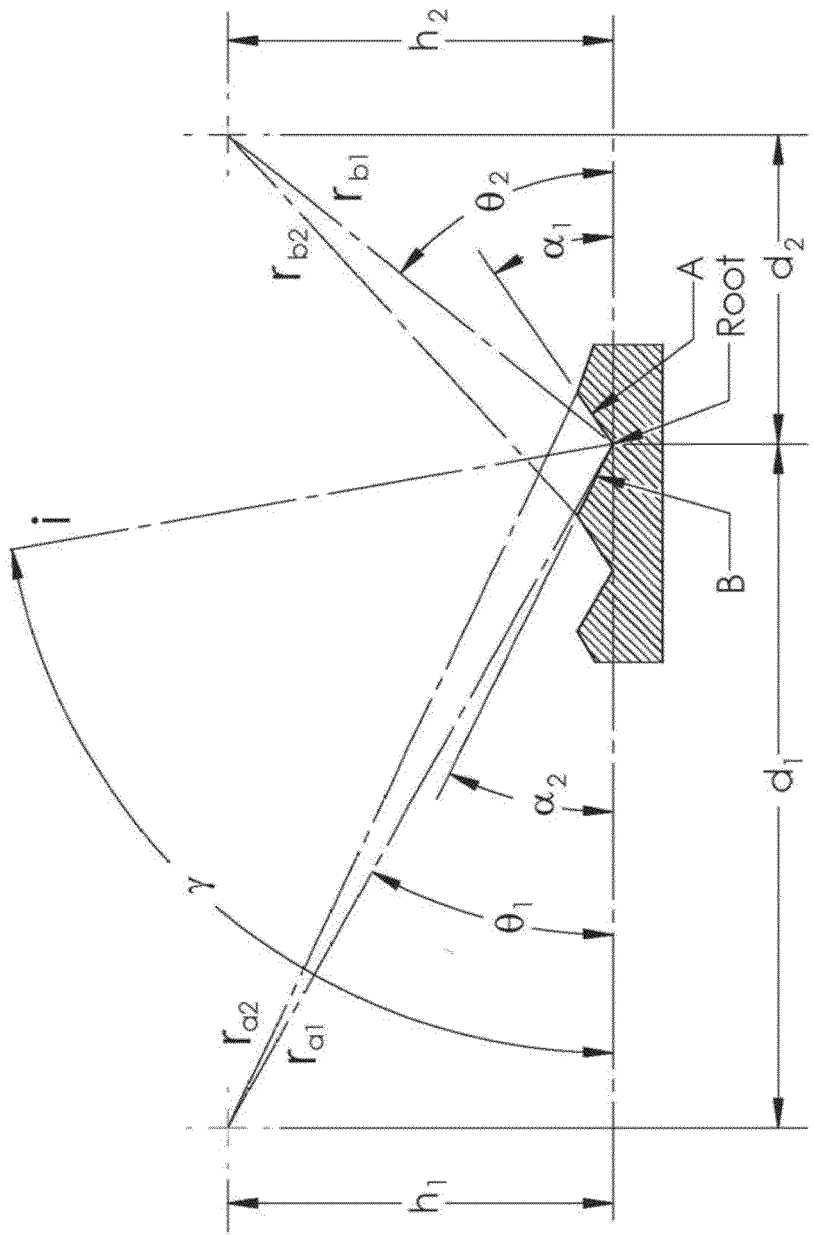

FIG. 24B shows a representative cross-section 2402, from a Fresnel reflector, with opposing reflecting facets A and B, whose surfaces are parabolic rather than flat. It will be appreciated that a parabolic surface can result in a more precise focus. In the case of a Fresnel reflector with a point focus, the surface might be a section of a parabola. In the case of a Fresnel reflector with a linear focus, the surface of the facet might be parabolic in the plane 90 degrees from the focal line. In both cases, the geometric focus of the parabola correlates to the focus of the Fresnel reflector. As shown in this figure, the relationships between angles, heights, and distances for parabolic cross-sections are similar to the relationships between angles, heights, and distances for flat cross-sections described above, but rays $r_{a1}$ and $r_{a2}$ converge at the focal point (as opposed to "focal region") $F_1$ and $r_{b1}$ and $r_{b2}$ converge at the focal point (as opposed to "focal region") $F_2$.

It should be noted that the facet angles, though generally designed to produce parallel rays, could slightly deviate from that design angle to produce non-parallel rays and still eliminate or reduce facet shading. Referring to both FIGS. 24A and 24B, the design angle γ, rather than being of a uniform angle for all triads, can be individually selected for each triad of reflectors such that their reflected radiation is at a predefined angle designed to produce a cluster of nonparallel rays that are either converging or diverging. In this way, the rays could be made to illuminate a wider diverging field or be made to converge (focus) at some distant point beyond the plane of the reflector, concentrating the many radiation sources into a single spot, in an example embodiment. In other example embodiments, the radiation might be other than light, e.g., microwave radiation or sound.

Figure 24C:
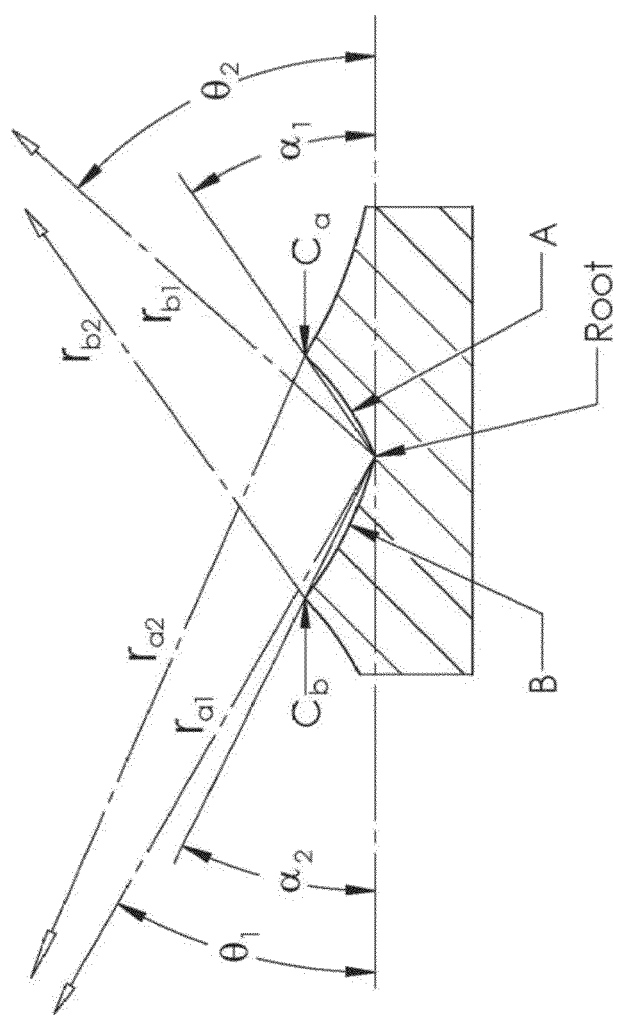

FIG. 24C shows the relationships between angles, heights, and distances for parabolic cross-sections in greater detail, emphasizing the parabolic nature of the surfaces of opposing reflecting facets A and B.

FIG. 24D shows example calculations of $\alpha_1$, $\theta_2$, $\alpha_2$, and $\theta_1$ for a Fresnel reflector with flat-surfaced opposing facets (e.g., FIG. 24A) and parabolic-surfaced opposing facets (e.g., FIGS. 24B and 24C). It will be appreciated that in alternative example embodiments, other curved surfaces could be used instead of parabolic surfaces, to simplify manufacturing. For example, a circular-surfaced cross-section might be used instead of a parabolic-surfaced opposing facet.

Tri-Focal Zones

Figure 25A:
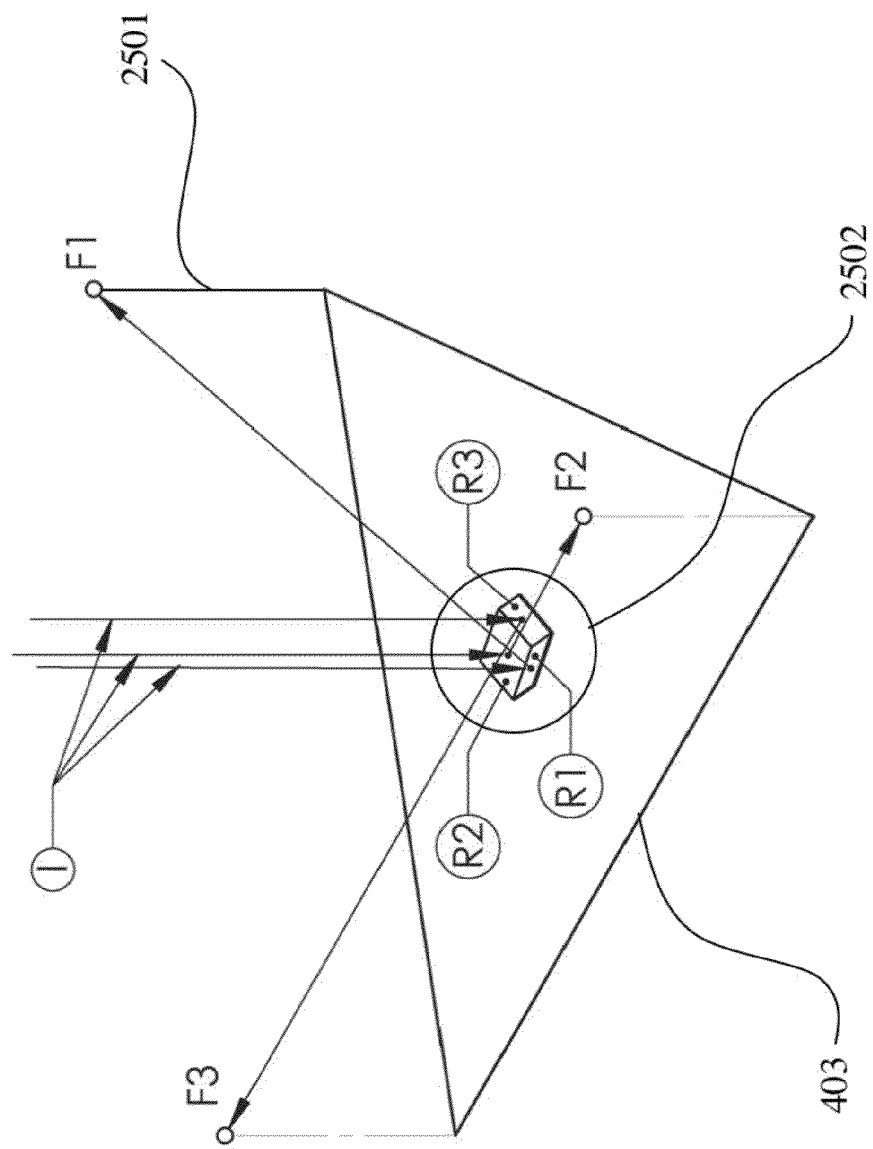
FIGS. 25A, 25B, and 25C are diagrams describing the relationship of reflecting facets in tri-focal zones, in accordance with example embodiments.
Figure 25B:
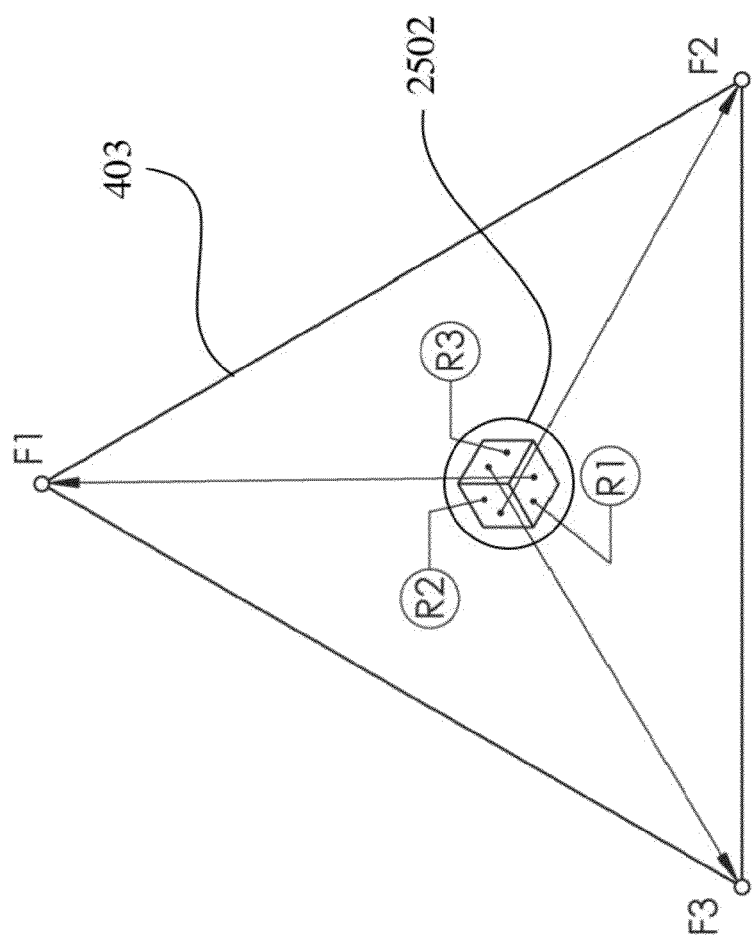
Figure 25C:
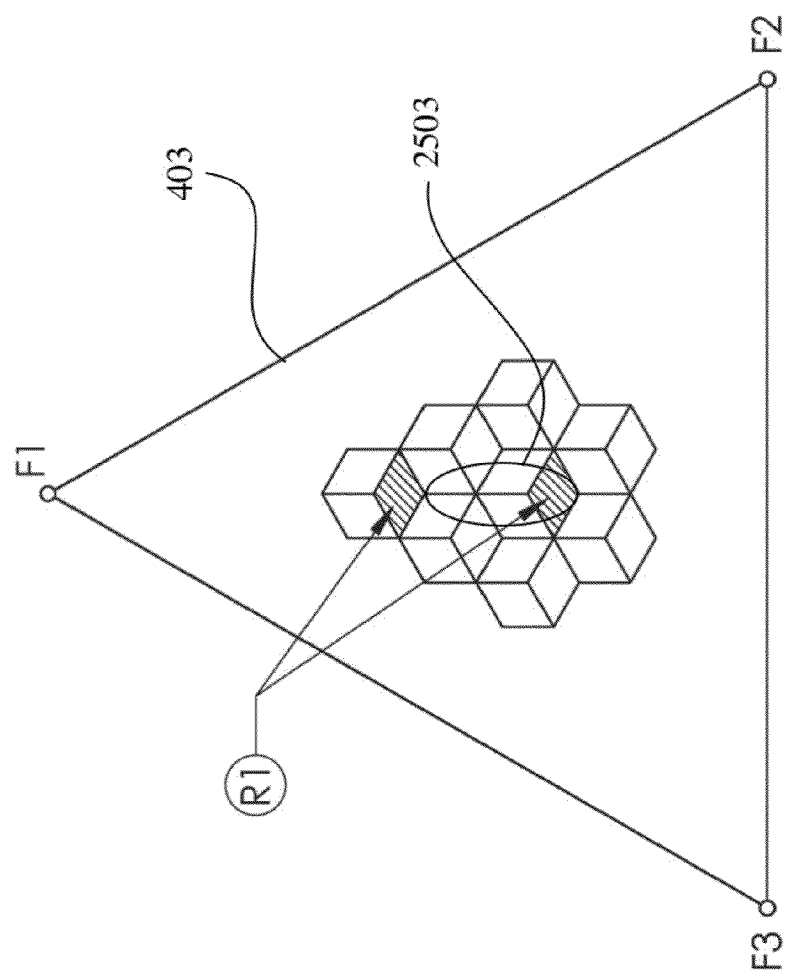

FIGS. 25A, 25B, and 25C are diagrams describing the relationship of reflecting facets in tri-focal zones, in accordance with example embodiments. FIG. 25A shows a tri-focal zone 403 with three corners. Above each corner, a receiver is located at a fixed height 2501. Tri-focal zone 403 includes numerous triads of reflecting facets, such as triad 2502. Each reflecting facet (e.g., R1, R2, and R3) in a triad (e.g., 2502) has a quadrilateral shape and shares a common edge with the adjacent reflecting facet. Similarly, all of the reflecting facets (e.g., R1, R2, and R3) in triad 2502 share a common corner.

As depicted in this figure, incident rays "I" of light (or other radiation such as microwave radiation or sound) are reflected from each reflecting facet (e.g., R1, R2, and R3) to its corresponding receiver (e.g., F1, F2, and F3). Thus, an incident ray reflected by reflecting facet R1 to receiver F1 is directed through the open space between reflecting facets R2 and R3. Likewise, an incident ray reflected by reflecting facet R2 to receiver F2 is directed through the open space between reflecting facets R1 and R3. And an incident ray reflected by reflecting facet R3 to receiver F3 is directed through the open space between reflecting facets R1 and R2. It will be appreciated that by reflecting incident radiation from one reflecting facet in a triad through the open space between the other reflecting facets in a triad, shorter focal-point heights (e.g., fixed height 2501) with reduced facet shading can be achieved than in the case where there are there are only two receivers and incident radiation is reflected over the top of an opposing reflecting facet.

As depicted in FIG. 25B, the three reflecting facets in a triad 2502 form a hexagon. In turn, as depicted in FIG. 25C, a number of triads can be combined to form larger hexagons within a zone 403. It will be appreciated that the distance 2503 between reflecting facets that share the same receiver in a tri-focal zone 403 can be greater than the distance between reflecting facets that share the same receiver when there are only two receivers. This greater distance might allow for shorter focal-point heights with reduced facet shading, in example embodiments.

Of course, these same observations would apply in an alternative example embodiment for generating collimated light, where the light receivers are replaced by light sources.

Although the foregoing example embodiments have been described in some detail for purposes of clarity of understanding, it will be apparent that certain changes and modifications may be practiced within the scope of the appended claims.

In this regard, other example embodiments include the following:

A. An apparatus for reducing facet shading, comprising a plurality of substrate modules, each substrate module including three points that form a triangle and including a plurality of reflecting regions interior to the three points, each region including three reflecting facets, where each facet is oriented such that light reflected from the facet is directed to one of the three points and is positioned to reduce facet shading from any other facet in the region or any other region.

B. An apparatus for reducing facet shading, comprising a substrate including four points that form a rectangle and including a plurality of reflecting regions interior to the four points, each region including four reflecting facets, where each facet is oriented such that light reflected from the facet is directed to one of the four points and is positioned to reduce facet shading from any other reflecting side in the region or any other region.

C. An apparatus for receiving radiation, comprising three receivers for receiving reflected radiation, wherein the receivers form a triangle in a plane approximately parallel to a reflecting surface and the reflecting surface which includes a plurality of reflectors, wherein each of the reflectors includes three mirrored facets which are each oriented such that light reflected from the facet is directed to one of the three receivers and wherein each of the reflectors is positioned with respect to the receivers and the other reflectors to reduce facet shading.

D. An apparatus as in C, wherein the reflecting surface is a modified Fresnel reflector.

E. An apparatus as in C, wherein the radiation is collimated.

F. An apparatus as in C, wherein the radiation is solar radiation.

G. An apparatus as in C, wherein the receivers are photovoltaic cells.

H. An apparatus for concentrating solar radiation, comprising a plurality of modules, each module including three receivers for receiving reflected radiation and a reflecting surface, wherein the receivers form a triangle in a plane approximately parallel to the reflecting surface and wherein the reflecting surface includes a plurality of reflectors, each of the reflectors including three mirrored facets which are each oriented such that light reflected from the facet is directed to one of the three receivers, wherein each of the reflectors is positioned with respect to the receivers and the other reflectors to reduce facet shading.

I. An apparatus as in H, wherein the modules form a heliostat array.

J. An apparatus for generating radiation, comprising a plurality of linear sources for producing radiation above a reflecting surface and the reflecting surface which includes a plurality of reflectors, wherein each of the reflectors includes two linear mirrored facets which are each oriented such that reflected light is directed from one of the linear sources and wherein each of the reflectors is positioned with respect to the sources and the other reflectors to reduce facet shading.

Accordingly, the example embodiments are to be considered as illustrative and not restrictive, and the invention is not to be limited to the details given herein, but may be modified within the scope and equivalents of the appended claims.

What is claimed is:

1. An apparatus for reducing facet shading, comprising a substrate including three points that form a triangle and including a plurality of reflecting regions interior to the three points, each region including three reflecting facets, where each facet is oriented such that light reflected from the facet is directed to one of the three points and is positioned to reduce facet shading from any other reflecting facet in the region or any other region.

2. An apparatus as in claim 1, further comprising a transparent body disposed over the substrate.

3. An apparatus as in claim 2, further comprising three receivers for receiving reflected radiation, each receiver being located on a top surface of the transparent body approximately above a point of the triangle.

4. An apparatus as in claim 1, further comprising a transparent body disposed over the substrate, where a top surface of the transparent body causes internal reflection.

5. An apparatus as in claim 4, further comprising three receivers for receiving reflected radiation, each receiver being located on a bottom surface of the transparent body approximately at a point of the triangle.

6. An apparatus as in claim 2, further comprising three sources for generating radiation, each source being located on a top surface of the transparent body approximately above a point of the triangle.

7. An apparatus as in claim 4, further comprising three sources for generating radiation, each source being located on a bottom surface of the transparent body approximately at a point of the triangle.

8. An apparatus for generating radiation, comprising three sources for producing radiation, wherein the sources form a triangle in a plane approximately parallel to a reflecting surface and the reflecting surface which includes a plurality of reflectors, wherein each of the reflectors includes three mirrored facets which are each oriented such that light is directed from one of the three sources and wherein each of the reflectors is positioned with respect to the sources and the other reflectors to reduce facet shading.

9. An apparatus as in claim 8, wherein the reflecting surface is a modified Fresnel reflector.

10. An apparatus as in claim 8, wherein the radiation is collimated light.

11. An apparatus as in claim 8, wherein the radiation converges to an area smaller than the reflecting surface and beyond the plane.

12. An apparatus as in claim 8, wherein the radiation diverges to an area larger than the reflecting surface and beyond the plane.

13. An apparatus as in claim 8, wherein the sources are light emitting diodes.

14. An apparatus for generating light, comprising a plurality of modules, each module including three sources for generating light and a reflecting surface, wherein the sources form a triangle in a plane approximately parallel to the reflecting surface, and wherein the reflecting surface includes a plurality of reflectors, each of the reflectors including three mirrored facets which are each oriented such that reflected light is directed from one of the three sources and wherein each of the reflectors is positioned with respect to the sources and the other reflectors to reduce facet shading.

15. An apparatus as in claim 14, wherein the modules form a lamp.

16. An apparatus as in claim 14, wherein the modules form a flashlight.

17. An apparatus as in claim 14, wherein the light is collimated light.

18. An apparatus as in claim 14, wherein the light converges to an area smaller than the reflecting surface and beyond the plane.

19. An apparatus as in claim 14, wherein the light diverges to an area larger than the reflecting surface and beyond the plane.

20. An apparatus as in claim 14, wherein the sources are light emitting diodes.

* * * * *